US012603901B1

(12) United States Patent
Hsu et al.

(10) Patent No.: US 12,603,901 B1
(45) Date of Patent: Apr. 14, 2026

(54) ANOMALY DETECTION AT EDGE DEVICES

(71) Applicant: VicOne Corporation, Tokyo (JP)

(72) Inventors: Shih-Han Hsu, Taipei (TW); Yen-Kai Wang, Taipei (TW); Yi-Ting Chen, Taipei (TW)

(73) Assignee: VicOne Corporation, Tokyo (JP)

( * ) Notice: Subject to any disclaimer, the term of this patent is extended or adjusted under 35 U.S.C. 154(b) by 17 days.

(21) Appl. No.: 18/779,434

(22) Filed: Jul. 22, 2024

(51) Int. Cl.
*G06F 15/16* (2006.01)
*G06F 9/54* (2006.01)
*H04L 9/40* (2022.01)
*H04L 29/06* (2006.01)
*H04L 41/16* (2022.01)

(52) U.S. Cl.
CPC .......... *H04L 63/1416* (2013.01); *H04L 41/16* (2013.01); *H04L 63/1425* (2013.01)

(58) Field of Classification Search
CPC .. H04L 63/1416; H04L 41/16; H04L 63/1425
USPC .......................................................... 726/23
See application file for complete search history.

(56) References Cited

U.S. PATENT DOCUMENTS

| | | | | | |
|---|---|---|---|---|---|
| 7,093,292 | B1 * | 8/2006 | Pantuso | .............. | H04L 63/1425 709/224 |
| 8,544,087 | B1 * | 9/2013 | Eskin | .................... | G06F 21/552 726/22 |
| 8,869,267 | B1 * | 10/2014 | Smith | ................. | H04L 63/1425 726/22 |
| 9,143,518 | B2 * | 9/2015 | Sidiroglou | .......... | H04L 63/1416 |
| 9,306,966 | B2 * | 4/2016 | Eskin | .................. | H04L 63/1425 |
| 9,450,979 | B2 * | 9/2016 | Keromytis | ............ | G06F 21/577 |
| 11,005,864 | B2 * | 5/2021 | Saunders | ............ | G06F 16/2365 |
| 11,171,974 | B2 * | 11/2021 | Gertner | .............. | H04L 63/1416 |
| 11,394,629 | B1 * | 7/2022 | Grilli | ........................ | G06F 7/08 |
| 2004/0054505 | A1 * | 3/2004 | Lee | ..................... | H04L 63/1466 702/186 |
| 2004/0059947 | A1 * | 3/2004 | Lee | ......................... | G06N 3/045 709/224 |
| 2005/0060295 | A1 * | 3/2005 | Gould | ................. | H04L 63/1425 |
| 2007/0118905 | A1 * | 5/2007 | Morin | ............... | G06Q 20/0855 709/224 |
| 2015/0058982 | A1 * | 2/2015 | Eskin | ..................... | G06F 16/84 726/23 |

(Continued)

FOREIGN PATENT DOCUMENTS

NL          2002694 C2 *  10/2010  ......... H04L 63/1416

OTHER PUBLICATIONS

"TinyLlama/TinyLlama-1.1B-Chat-v1.0", Hugging Face, Downloaded Jul. 17, 2024, https://huggingface.co/TinyLlama/TinyLlama-1.1_B-Chat-v1_.0.

(Continued)

*Primary Examiner* — Hamza N Algibhah
(74) *Attorney, Agent, or Firm* — Beyer Law Group LLP

(57)          ABSTRACT

An edge device extracts a data segment of monitoring data and generates a summary of the data segment. The summary is classified using a generative artificial intelligence (AI) model. The classification is validated based on similarity of the summary to previous summaries that have the same classification as the summary. The summary and the previous summaries are stored as event data in an event database. Event data in the event database are marked for upload to a backend system as feedback data, which is used to update the generative AI model.

12 Claims, 26 Drawing Sheets

(56) References Cited

U.S. PATENT DOCUMENTS

| | | | |
|---|---|---|---|
| 2016/0127395 A1* | 5/2016 | Underwood | G06F 21/556 |
| | | | 726/23 |
| 2016/0226894 A1* | 8/2016 | Lee | H04L 63/1416 |
| 2020/0021607 A1* | 1/2020 | Muddu | G06F 3/04842 |
| 2022/0021695 A1* | 1/2022 | Papamartzivanos | G06F 21/55 |
| 2022/0385674 A1* | 12/2022 | Donbosco | G06N 5/04 |
| 2023/0205887 A1* | 6/2023 | Velivela | G06F 21/45 |
| 2023/0215261 A1* | 7/2023 | Zamanpour | G08B 21/043 |
| | | | 340/573.1 |
| 2024/0129325 A1* | 4/2024 | Lu | H04L 63/1425 |
| 2025/0106185 A1* | 3/2025 | Ieong | H04L 63/1416 |

OTHER PUBLICATIONS

"Build the Future of AI with Meta Llama 3", Meta, Downloaded 17, 2024, https://llama.meta.com/llama3/.

"Microsoft/Phi-3-mini-128k-instruct", Hugging Face, https://huggingface.co/microsoft/Phi-3-mini-128k-instruct, Downloaded Jul. 17, 2024.

"Mamba (deep learning architecture))", Wikipedia, https://en.wikipedia.org/wiki/Mamba_(deep_learning_architecture)), Downloaded Jul. 17, 2024.

"Huggingface/peft PEFT: State-of-the-art Parameter-Efficient Fine-Tuning", GitHub, https://github.com/huggingface/peft, Downloaded Jul. 17, 2024.

"Microsoft/LoRAL Code for loralib, an implementation of 'LoRA: Low-Rank Adaptation of Large Language Models'", GitHub, https://github.com/microsoft!LoRA.

Cameron R. Wolfe, "Decoder-Only Transformers: The Workhorse of Generative LLMs", https://cameronrwolfe.substack.com/p/decoder-only-transformers-the-workhorse, Mar. 4, 2024.

Brandon McKinzie, Zhe Gan, Jean-Philippe Fauconnier, Sam Dodge, Bowen Zhang, Philipp Dufter, Dhruti Shah, Xianzhi Du, Futang Peng, Floris Weers, Anton Belyi, Haotian Zhang, Karanjeet Singh, Doug Kang, Ankur Jain, Hongyu Hè, Max Schwarzer, Tom Gunter, Xiang Kong, Aonan Zhang, Jianyu Wang, Chong Wang, Nan Du, Tao Lei, Sam Wiseman, Guoli Yin, Mark Lee, Zirui Wang, Ruoming Pang, Peter Grasch, Alexander Toshev, and Yinfei Yang, "MM1: Methods, Analysis & Insights from Multimodal LLM Pre-training", Apr. 18, 2024.

* cited by examiner

Figure 7:
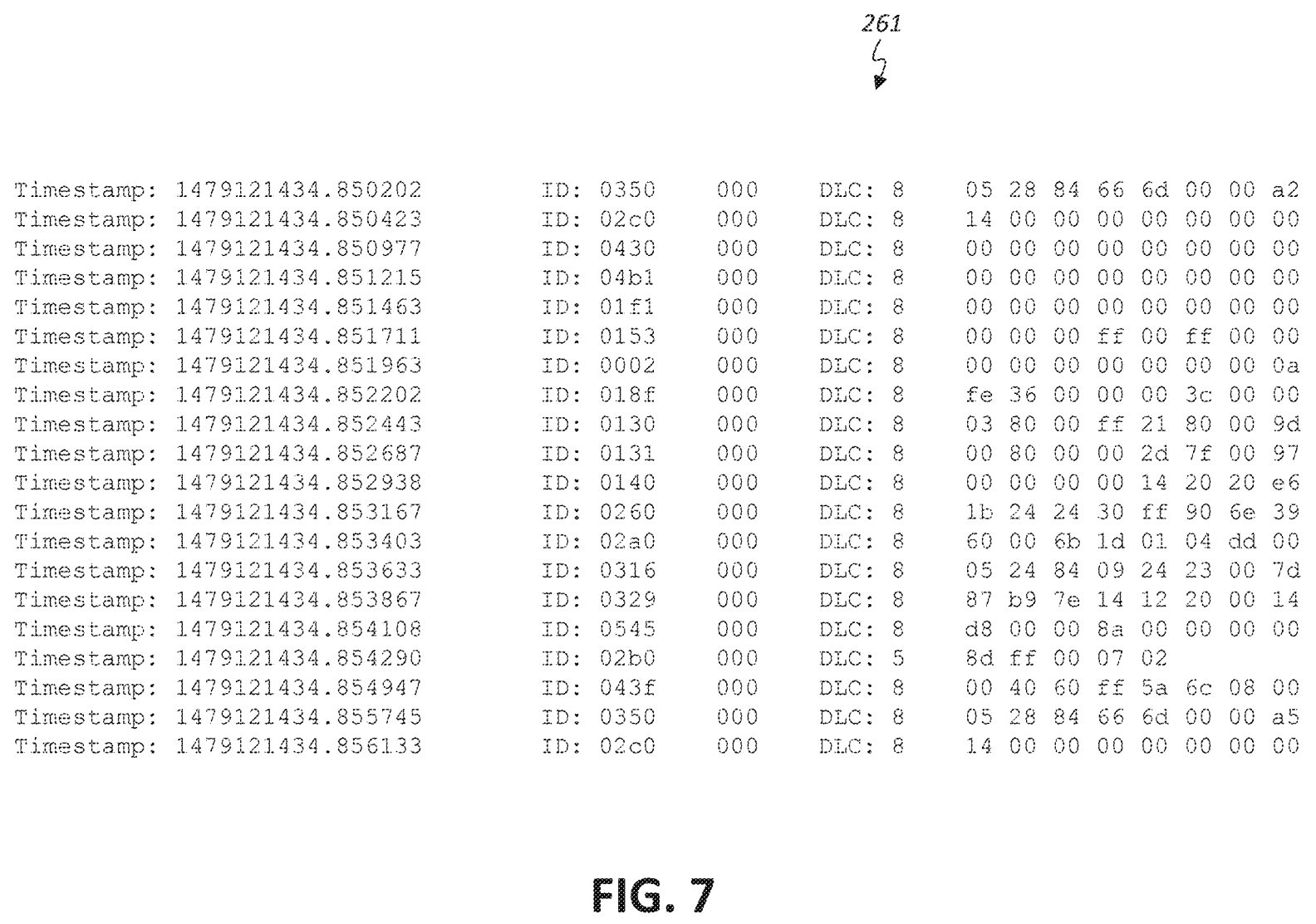

261

```
Timestamp: 1479121434.850202   ID: 0350   000   DLC: 8   05 28 84 66 6d 00 00 a2
Timestamp: 1479121434.850423   ID: 02c0   000   DLC: 8   14 00 00 00 00 00 00 00
Timestamp: 1479121434.850977   ID: 0430   000   DLC: 8   00 00 00 00 00 00 00 00
Timestamp: 1479121434.851215   ID: 04b1   000   DLC: 8   00 00 00 00 00 00 00 00
Timestamp: 1479121434.851463   ID: 01f1   000   DLC: 8   00 00 00 00 00 00 00 00
Timestamp: 1479121434.851711   ID: 0153   000   DLC: 8   00 00 ff ff 00 00 00 00
Timestamp: 1479121434.851963   ID: 0002   000   DLC: 8   00 00 00 00 00 00 00 0a
Timestamp: 1479121434.852202   ID: 018f   000   DLC: 8   fe 36 00 00 3c 00 00 00
Timestamp: 1479121434.852443   ID: 0130   000   DLC: 8   03 80 00 ff 21 80 00 9d
Timestamp: 1479121434.852687   ID: 0131   000   DLC: 8   00 80 00 2d 7f 00 00 97
Timestamp: 1479121434.852938   ID: 0140   000   DLC: 8   00 00 00 14 20 20 00 e6
Timestamp: 1479121434.853167   ID: 0260   000   DLC: 8   1b 24 30 ff 90 6e 00 39
Timestamp: 1479121434.853403   ID: 02a0   000   DLC: 8   60 00 6b 1d 01 04 dd 00
Timestamp: 1479121434.853633   ID: 0316   000   DLC: 8   05 24 84 09 24 23 00 7d
Timestamp: 1479121434.853867   ID: 0329   000   DLC: 8   87 b9 7e 14 12 20 00 14
Timestamp: 1479121434.854108   ID: 0545   000   DLC: 8   d8 00 8a 00 00 00 00 00
Timestamp: 1479121434.854290   ID: 02b0   000   DLC: 5   8d ff 00 07 02
Timestamp: 1479121434.854947   ID: 043f   000   DLC: 8   00 40 60 ff 5a 6c 08 00
Timestamp: 1479121434.855745   ID: 0350   000   DLC: 8   05 28 84 66 6d 00 00 a5
Timestamp: 1479121434.856133   ID: 02c0   000   DLC: 8   14 00 00 00 00 00 00 00
```

```
[Observed ID occurrence]
0350: 2      0140: 1
02c0: 2      0260: 1
0430: 1      02a0: 1
04b1: 1      0316: 1
01f1: 1      0329: 1
0153: 1      0545: 1
0002: 1      02b0: 1
018f: 1      043f: 1
0130: 1
0131: 1

[ID Channel Mapping]
0350: 000    0140: 000
02c0: 000    0260: 000
0430: 000    02a0: 000
04b1: 000    0316: 000
01f1: 000    0329: 000
0153: 000    0545: 000
0002: 000    02b0: 000
018f: 000    043f: 000
0130: 000
0131: 000

[ID Frequency]
0350: 0.005    0140: 0.005
02c0: 0.005    0260: 0.005
0430: 0.005    02a0: 0.005
04b1: 0.005    0316: 0.005
01f1: 0.01     0329: 0.05
0153: 0.005    0545: 0.01
0002: 0.01     02b0: 0.01
018f: 0.06     043f: 0.004
0130: 0.05
0131: 0.005
```

```
[Representative Payload Information]
0350:
      05 28 84 66 6d 00 00 a2
      05 28 84 66 6d 00 00 a5 : 2
02c0:
      14 00 00 00 00 00 00 00
0430:
      00 00 00 00 00 00 00 00
04b1:
      00 00 00 00 00 00 00 00
01f1:
      00 00 00 00 00 00 00 00
0153:
      00 00 00 ff 00 ff 00 00
0002:
      00 00 00 00 00 00 00 0a
018f:
      fe 36 00 00 00 3c 00 00
0130:
      03 80 00 ff 21 80 00 9d
0131:
      00 80 00 00 2d 7f 00 97
0140:
      00 00 00 00 14 20 20 e6
0260:
      1b 24 24 30 ff 90 6e 39
02a0:
      60 00 6b 1d 01 04 dd 00
0316:
      05 24 84 09 24 23 00 7d
0329:
      87 b9 7e 14 12 20 00 14
0545:
      d8 00 00 8a 00 00 00 00
02b0:
      8d ff 00 07 02
043f:
      00 40 60 ff 5a 6c 08 00
```

Figure 9:
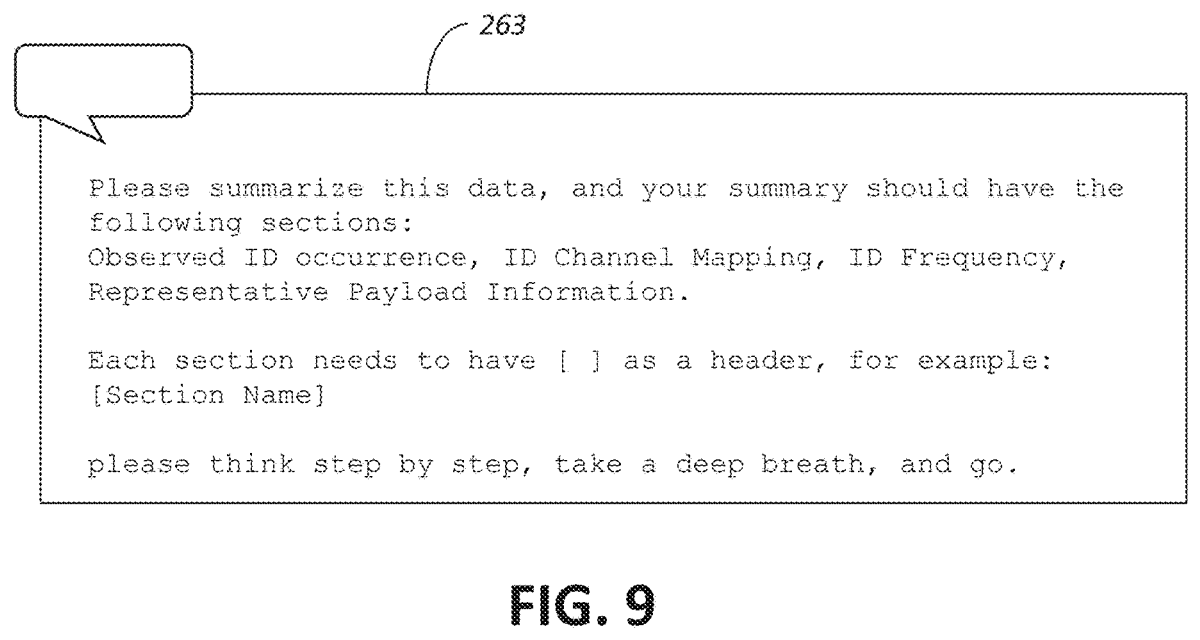

Please summarize this data, and your summary should have the following sections:
Observed ID occurrence, ID Channel Mapping, ID Frequency, Representative Payload Information.

Each section needs to have [ ] as a header, for example:
[Section Name]

please think step by step, take a deep breath, and go.

Figure 10:
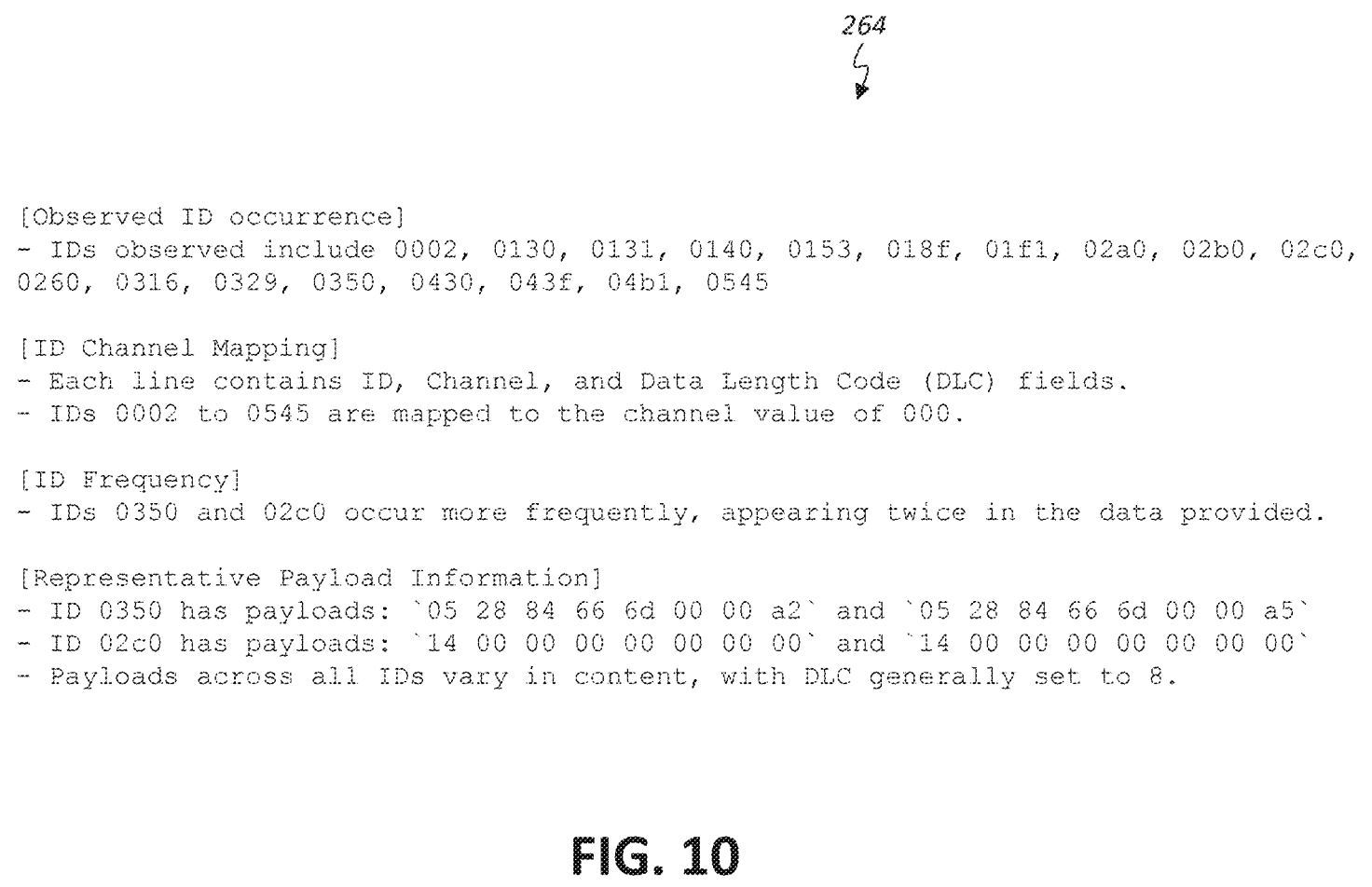

[Observed ID occurrence]
- IDs observed include 0002, 0130, 0131, 0140, 0153, 018f, 01f1, 02a0, 02b0, 02c0, 0260, 0316, 0329, 0350, 0430, 043f, 04b1, 0545

[ID Channel Mapping]
- Each line contains ID, Channel, and Data Length Code (DLC) fields.
- IDs 0002 to 0545 are mapped to the channel value of 000.

[ID Frequency]
- IDs 0350 and 02c0 occur more frequently, appearing twice in the data provided.

[Representative Payload Information]
- ID 0350 has payloads: `05 28 84 66 6d 00 00 a2` and `05 28 84 66 6d 00 00 a5`
- ID 02c0 has payloads: `14 00 00 00 00 00 00 00` and `14 00 00 00 00 00 00 00`
- Payloads across all IDs vary in content, with DLC generally set to 8.

```
May  7 00:00:01 ai-pc systemd[1]: Finished Rotate log files.
May  7 00:00:01 ai-pc systemd[1]: atop.service: Succeeded.
May  7 00:00:01 ai-pc systemd[1]: Stopped Atop advanced
performance monitor.
May  7 00:00:01 ai-pc systemd[1]: Started Atop advanced
performance monitor.
May  7 00:00:01 ai-pc systemd[1]: man-db.service: Succeeded.
May  7 00:00:01 ai-pc systemd[1]: Finished Daily man-db
regeneration.
May  7 00:02:16 ai-pc PackageKit: daemon quit
May  7 00:02:16 ai-pc systemd[1]: packagekit.service: Succeeded.
May  7 00:17:01 ai-pc CRON[2014232]: (root) CMD (   cd / && run-
parts --report /etc/cron.hourly)
May  7 01:17:01 ai-pc CRON[2014244]: (root) CMD (   cd / && run-
parts --report /etc/cron.hourly)
May  7 02:17:01 ai-pc CRON[2014258]: (root) CMD (   cd / && run-
parts --report /etc/cron.hourly)
May  7 02:59:42 ai-pc systemd[1]: Started Session 9685 of user
riz_hsu.
May  7 03:00:07 ai-pc systemd[1]: Started Session 9686 of user
riz_hsu.
May  7 03:02:22 ai-pc systemd[1]: Started Session 9687 of user
riz_hsu.
May  7 03:04:10 ai-pc systemd[1]: session-9687.scope: Succeeded.
May  7 03:10:01 ai-pc CRON[2014767]: (root) CMD (test -e /run/
systemd/system || SERVICE_MODE=1 /sbin/e2scrub_all -A -r)
May  7 03:17:01 ai-pc CRON[2014780]: (root) CMD (   cd / && run-
parts --report /etc/cron.hourly)
May  7 04:17:01 ai-pc CRON[2015358]: (root) CMD (   cd / && run-
parts --report /etc/cron.hourly)
May  7 04:47:58 ai-pc NetworkManager[757825]: <info>
[1715057278.8808] manager: NetworkManager state is now
CONNECTED_SITE
May  7 04:47:58 ai-pc whoopsie[1560]: [04:47:58] offline
May  7 04:47:58 ai-pc dbus-daemon[1092]: [system] Activating via
systemd: service name='org.freedesktop.nm_dispatcher' unit='dbus-
org.freedesktop.nm-dispatcher.service' requested by ':1.3757'
(uid=0 pid=757825 comm="/usr/sbin/NetworkManager --no-daemon "
label="unconfined")
May  7 04:47:58 ai-pc systemd[1]: Starting Network Manager Script
Dispatcher Service...
```

Figure 13:
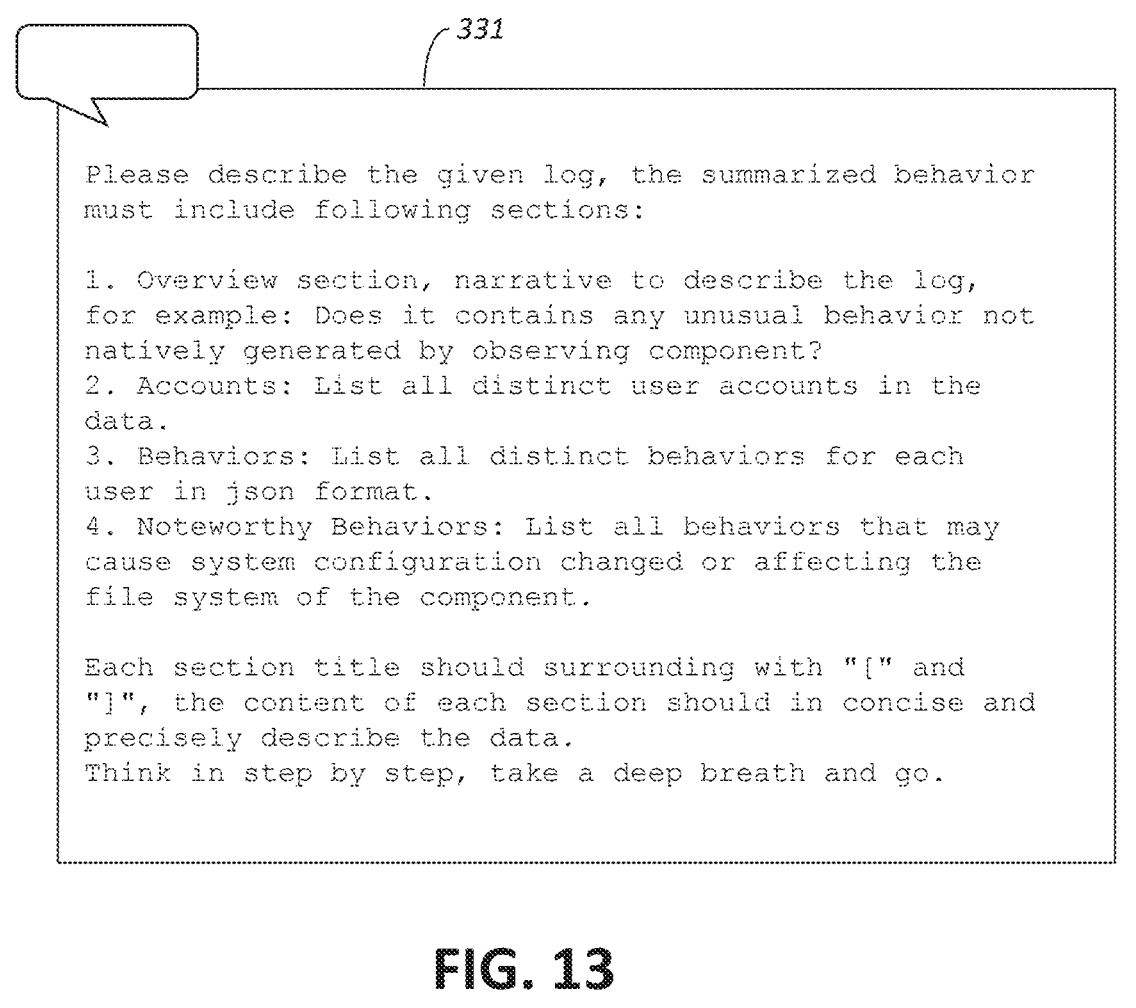

Please describe the given log, the summarized behavior
must include following sections:

1. Overview section, narrative to describe the log,
for example: Does it contains any unusual behavior not
natively generated by observing component?
2. Accounts: List all distinct user accounts in the
data.
3. Behaviors: List all distinct behaviors for each
user in json format.
4. Noteworthy Behaviors: List all behaviors that may
cause system configuration changed or affecting the
file system of the component.

Each section title should surrounding with "[" and
"]", the content of each section should in concise and
precisely describe the data.
Think in step by step, take a deep breath and go.

```
[Overview]
The log from the system (ai-pc) contains routine operations performed
by various system components. It primarily shows activities such as
service rotations, service startups and stops, session starts, network
management events, and scheduled tasks (CRON jobs). There is no
indication of any unusual or malicious activity deviating from normal
system operations. Most activities are automated system maintenance
tasks or network management events.

[Accounts]
- root
- riz_hsu

[Behaviors]
```json
{
  "root": [
    "Rotate log files",
    "Run Atop advanced performance monitor",
    "Regenerate man-db daily",
    "Run PackageKit",
    "Execute scheduled CRON jobs",
    "Network management activities",
    "Clean up temporary directories",
    "Run Ubuntu Advantage Timer for repeated jobs"
  ],
  "riz_hsu": [
    "Started sessions"
  ]
}
```

[Noteworthy Behaviors]
- The activities involving `systemd-tmpfiles-clean.service` for
cleaning up temporary directories and `e2scrub_all` command from a
CRON job could potentially affect the file system by altering or
deleting temporary files.
- Running the `Ubuntu Advantage Timer for repeated jobs` could
potentially change system configurations depending on the scripts
executed.
- The CRON job execution commands could potentially affect system
configurations or file systems depending on the scripts that are being
run.
```

```
{
  "driver_id": "unknown",
  "timestamp": "2024-05-07T14:25:00Z",
  "face_recognition": {
    "recognized": false,
    "confidence": 0.0
  },
  "attention_tracking": {
    "eye_gaze_direction": "right",
    "head_position": "tilted_right",
    "attention_level": "low"
  },
  "fatigue_detection": {
    "eye_blink_rate": 15,
    "eye_closure_duration": 0.1,
    "yawning_count": 0
  },
  "drowsiness_warning": {
    "alert": false
  },
  "distraction_detection": {
    "is_distracted": true,
    "distraction_type": "using_phone"
  },
  "driving_behavior_analysis": {
    "speeding": false,
    "harsh_braking": false,
    "lane_departure": false
  },
  "heart_rate": 78,
  "breathing_rate": 18,
  "seat_sensor": {
    "is_seated": true,
    "seatbelt_fastened": true
  },
  "alert_system": {
    "visual_alert": true,
    "audio_alert": true,
    "vibration_alert": false
  },
  "car_environment": {
    "temperature": 22,
    "humidity": 40
  }
}
```

[Driver Monitoring System]

In provided descriptions, driver monitoring systems capture instances of distracted driving. The first report details an unidentified driver exhibiting high-risk behavior, like using two phones simultaneously, which led to severe warnings and actions to alert the driver and record the event. The second file identifies driver '12345' and presents low attention levels due to phone use, but without severe driving violations. Both systems prioritize safety through alert mechanisms and detailed analyses of driving behavior, distraction, and environmental factors to mitigate risks effectively.

```json
{
    "driver_id": "unknown",
    "timestamp": "2024-05-07TXX:XX:XXZ",   // Placeholder for the exact time
    "vehicle_speed": "unknown",   // Placeholder for the speed data
    "driver_state": {
        "hands_on_wheel": false,
        "eyes_on_road": false,
        "using_phone": true,
        "phones_in_use": 2
    },
    "warnings": {
        "distracted_driving": true,
        "handheld_phone_usage": true,
        "high_danger": true
    },
    "actions": [
        {
            "action": "alert_driver",
            "severity": "high"
        },
        {
            "action": "record_event",
            "severity": "high"
        }
    ]
}
```

Figure 18:
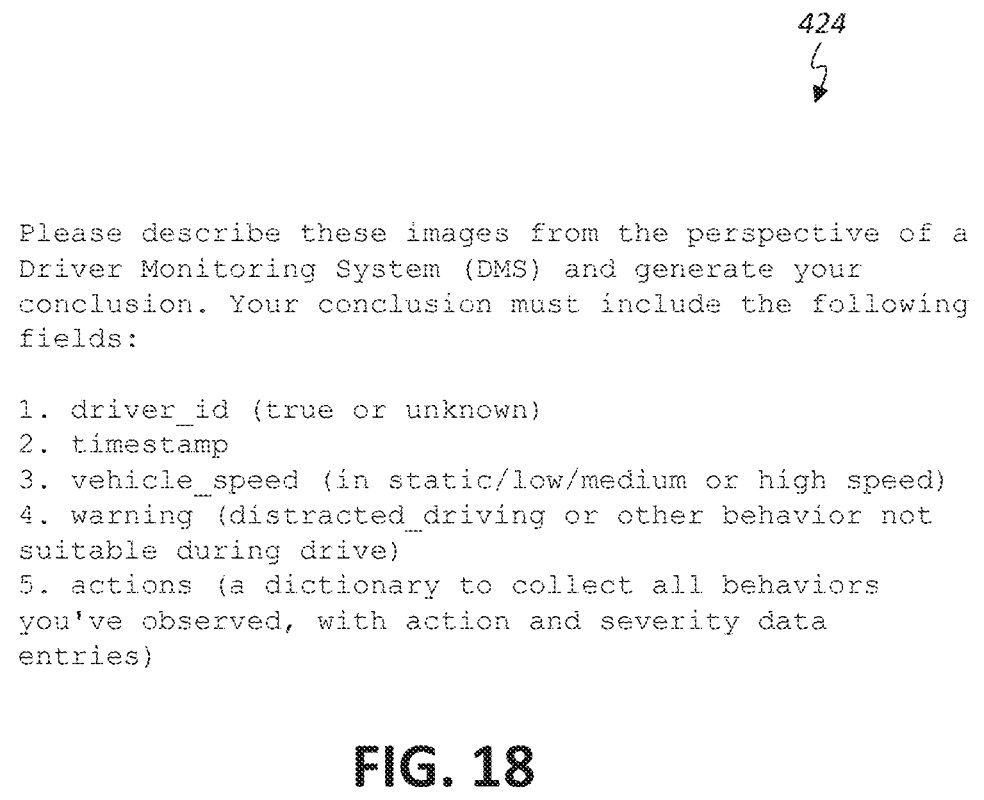

Please describe these images from the perspective of a
Driver Monitoring System (DMS) and generate your
conclusion. Your conclusion must include the following
fields:

1. driver_id (true or unknown)
2. timestamp
3. vehicle_speed (in static/low/medium or high speed)
4. warning (distracted_driving or other behavior not
suitable during drive)
5. actions (a dictionary to collect all behaviors
you've observed, with action and severity data
entries)

```
{
    "driver_id": "unknown",
    "timestamp": "2024-05-07TXX:XX:XXZ",
    "vehicle_speed": "unknown",
    "driver_state": {
        "hands_on_wheel": false,
        "eyes_on_road": false,
        "using_phone": true,
        "phones_in_use": 2
    },
    "warnings": {
        "distracted_driving": true,
        "handheld_phone_usage": true,
        "high_danger": true
    },
    "actions": [
        {
            "action": "alert_driver",
            "severity": "high"
        },
        {
            "action": "record_event",
            "severity": "high"
        }
    ]
}
```

Figure 22:
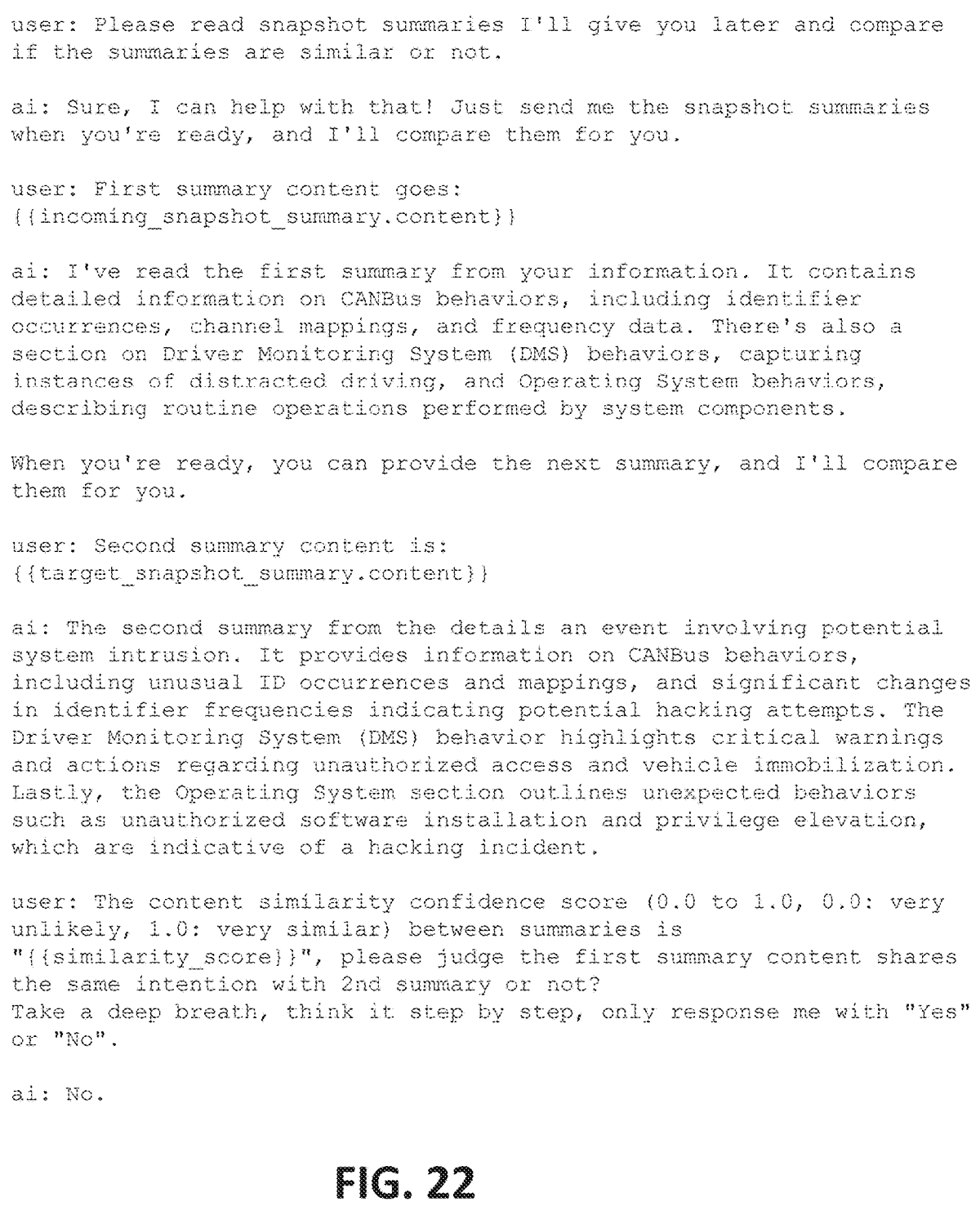

FIG. 19 user: Please read snapshot summaries I'll give you later and compare
if the summaries are similar or not.

ai: Sure, I can help with that! Just send me the snapshot summaries
when you're ready, and I'll compare them for you.

user: First summary content goes:
{{incoming_snapshot_summary.content}} ai: I've read the first summary from your information. It contains
detailed information on CANBus behaviors, including identifier
occurrences, channel mappings, and frequency data. There's also a
section on Driver Monitoring System (DMS) behaviors, capturing
instances of distracted driving, and Operating System behaviors,
describing routine operations performed by system components.

When you're ready, you can provide the next summary, and I'll compare
them for you.

user: Second summary content is:
{{target_snapshot_summary.content}} ai: The second summary from the details an event involving potential
system intrusion. It provides information on CANBus behaviors,
including unusual ID occurrences and mappings, and significant changes
in identifier frequencies indicating potential hacking attempts. The
Driver Monitoring System (DMS) behavior highlights critical warnings
and actions regarding unauthorized access and vehicle immobilization.
Lastly, the Operating System section outlines unexpected behaviors
such as unauthorized software installation and privilege elevation,
which are indicative of a hacking incident.

user: The content similarity confidence score (0.0 to 1.0, 0.0: very
unlikely, 1.0: very similar) between summaries is
"{{similarity_score}}", please judge the first summary content shares
the same intention with 2nd summary or not?
Take a deep breath, think it step by step, only response me with "Yes"
or "No".

ANOMALY DETECTION AT EDGE DEVICES

TECHNICAL FIELD

The present disclosure is generally directed to cybersecurity, and more particularly to cybersecurity at edge devices.

BACKGROUND

An edge device is a device of a computer network that is deployed at the edge, i.e., boundary, of the network. Edge devices are responsible for connecting different networks and often handle data processing and management tasks close to the source of data generation. In traditional networks, edge devices can include a wide range of hardware, such as routers, switches, gateways, firewalls, Internet of Things (IoT) devices, etc. In connected vehicles, edge devices can include electronic control units (ECUs), telematics control units (TCUs), central gateways, Controller Area Network (CAN) gateways, etc.

Network intrusion is unauthorized access to a computer network. It involves actions where an attacker gains access to network resources without permission, often with malicious intent. Network intrusion leads to malicious activities, such as stealing sensitive data, disrupting services, or installing malicious software.

Embodiments of the present invention pertain to detecting anomalies, including events indicative of network intrusion, at edge devices.

BRIEF SUMMARY

In one embodiment, an edge device extracts a data segment of monitoring data and generates a summary of the data segment. The summary is classified using a generative artificial intelligence (AI) model. The classification is validated based on similarity of the summary to previous summaries that have the same classification as the summary. The summary and the previous summaries are stored as event data in an event database. Event data in the event database are marked for upload to a backend system as feedback data, which is used to update the generative AI model.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 7 shows an example of time series log data.

FIGS. 8A and 8B show an example of a summary for the time series log data of FIG. 7.

FIG. 10 shows an example summary that is output by a generative AI summarizer responsive to the prompt of FIG. 9.

FIG. 9 shows an example of a prompt for the time series log data of FIG. 7.

FIG. 12 shows an example of plaintext log data.

FIG. 13 shows an example prompt for the plaintext log data of FIG. 12.

FIG. 14 shows an example of a summary generated by a generative AI summarizer for the plaintext log data of FIG. 12 responsive to the prompt of FIG. 13.

FIG. 16 shows an example driver monitoring system (DMS) detection log.

FIG. 17 shows an example summary of the DMS detection log of FIG. 16.

FIG. 18 shows an example prompt for generating a description of an image.

FIG. 19 shows an example description responsive to the prompt of FIG. 18.

FIG. 22 shows an example where Chain of Thought (CoT) methodology is used to confirm similarity between an input summary and a summary from an event database, in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
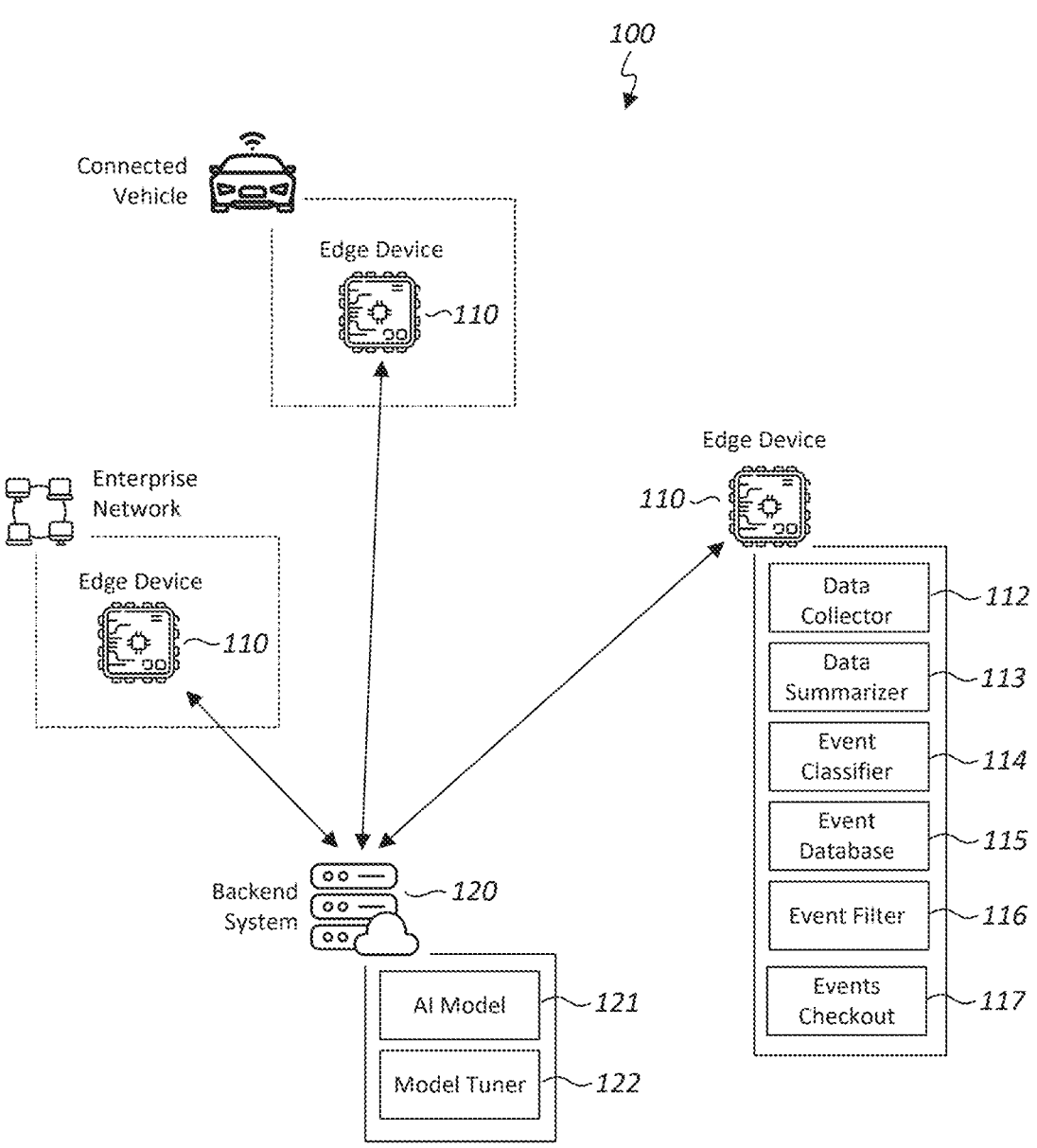
FIG. 1 shows a block diagram of a system for detecting anomalies at an edge device, in accordance with an embodiment of the present invention.

FIG. 1 shows a block diagram of a system 100 for detecting anomalies at an edge device, in accordance with an embodiment of the present invention. An anomaly is an event within a computer network that is significant enough to potentially affect the security, operations, or performance of the network or its components. An anomaly includes any observable action or change that can indicate a potential security incident, policy violation, network intrusion, system malfunction, or other conditions that warrant attention or investigation. In one embodiment, the system 100 allows for detection of intrusion events at an edge device.

In the example of FIG. 1, the system 100 includes a plurality of edge devices 110 and a backend system 120. An edge device 110 may include at least one processor and a memory. An edge device 110 may also include hardware components that speed up artificial intelligence (AI) and other machine learning (ML) operations, such as a graphics processing unit (GPU), neural processing unit (NPU), etc.

An edge device 110 may be deployed on different computer networks. For example, an edge device 110 may be a router, gateway, firewall, Internet of Things (IoT) device, etc. of a traditional enterprise network (e.g., computer network of a company, government, educational institution). As another example, an edge device 110 may be an electronic control unit (ECU) of a connected vehicle, such as ECUs that serve as a telematics control unit (TCU), central gateway, Controller Area Network (CAN) gateway, etc. An edge device 110 is configured to locally detect anomalies, which in one embodiment includes intrusion events.

In the example of FIG. 1, an edge device 110 includes a data collector 112, data summarizer 113, event classifier 114, event database 115, event filter 116, and an events checkout module 117.

In one embodiment, the data collector 112 comprises hardware and/or software components for monitoring for events that occur on the computer network attached to the edge device 110 and collecting monitoring data of the events. The data collector 112 may be one or more components of an ECU that monitors the CAN bus on a connected vehicle, network adapter and network stack that monitor network traffic on a local area network (LAN), a security information and event management (SIEM) system of an enterprise network, a driver monitoring system (DMS) of a connected vehicle, and/or other component that monitors a computer network for anomalies.

The type of the monitoring data collected by the data collector 112 depends on the particulars of the data channel being monitored, i.e., source of the monitoring data. For example, the monitoring data may be time series log data in the case of CAN bus data, log data in the case of system or network logs, complex data in the case of a combination of image data and log data, etc. The monitoring data may be collected and processed in segments, with each individual segment being a snapshot of the monitoring data. A segment of the monitoring data may be collected every process execution cycle (which can take several minutes), periodically, etc. A segment of monitoring data is also referred to herein as a "data segment".

In one embodiment, the data summarizer 113 comprises software components that receive a data segment and generate a summary of the data segment. More particularly, the data summarizer 113 creates a representative summary of a data segment, which is also simply referred to herein as "summary", to facilitate input of the data segment to the event classifier 114. The data summarizer 113 may be implemented using a generative AI model. The data summarizer 113 may also be implemented using a predefined summarizer program code to reduce computational load on the edge device 110.

In one embodiment, the event classifier 114 comprises hardware (e.g., NPU, GPU) and software components that receive a summary and classify the summary into one of a plurality of classes of events. In the example of FIG. 1, the event classifier 114 comprises a generative AI model 121, such as a transformer-based deep neural network. The generative AI model 121 is pretrained in the backend system 120 using samples of normal events and intrusion events. This allows the generative AI model 121 to recognize normal events, intrusion events, and abnormal events from a summary of a data segment. A normal event classification indicates that the corresponding summary (and thus the corresponding segment of monitoring data) describes a normal operation on the computer network; an intrusion event classification indicates that the corresponding summary describes an intrusion to the computer network; and an abnormal event classification indicates that the corresponding summary describes an operation that is not normal on the computer network. The generative AI model 121 may incorporate retrieval-augmented generation (RAG) techniques to perform classification. As can be appreciated, the event classifier 114 may also be employed to recognize other classes of events by suitable adjustments to the training and configuration of its generative AI model 121.

In one embodiment, the event database 115 comprises hardware (e.g., storage device) and software components for storing and retrieving event data. An event data includes a summary of a data segment and classification of the summary. The event classifier 114 may access the event database 115 to retrieve event data for retrieval-augmented generation (RAG), etc. The event classifier 114 may validate a classification of an input summary based on similarity of the input summary to other summaries that are represented in the event database 115 (i.e., have corresponding event data in the event database 115) that have the same classification as the input summary. Similarities between summaries may be determined based on distances between the summaries in vector space. More particularly, summaries may be converted to vectors, and the distances between vectors may be calculated to determine whether the corresponding summaries are similar. For example, a distance between two vectors may be compared to a threshold; two summaries are similar when the distance between their vectors are less than the threshold.

In one embodiment, the event filter 116 comprises software components for updating the event database 115 with new event data based on the classification of the summary represented by the event data, confidence level of the classification (e.g., by confidence score), and similarity of the summary to other summaries represented in the event database 115.

In one embodiment, the events checkout module 117 comprises software components for identifying event data that will be uploaded to the backend system 120 as part of feedback data. The feedback data may be used for further analysis of particular event data, for updating of the generative AI model 121, etc.

The backend system 120 may be implemented on a dedicated server computer system, interconnected computer systems, a cloud computing platform (e.g., Amazon Web Services™ (AWS) platform), or other computer system. The backend system 120 may communicate with the edge devices 110 over the public Internet, for example. In one embodiment, the AI model 121 is pretrained on the backend system 120 and thereafter provided to the edge devices 110.

In the example of FIG. 1, the backend system 120 includes a model tuner 122, which in one embodiment is a software component that adjusts an adapter, using fine-tuning techniques, based on feedback data from the edge device 110. The adapter is a module or layer that may be added to the generative AI model 121 to update the generative AI model 121 without requiring extensive retraining of the entire model. The adapter is downloaded to the edge device 110 in the next update cycle, and thereafter used to update the generative AI model 121 of the event classifier 114.

Figure 2:
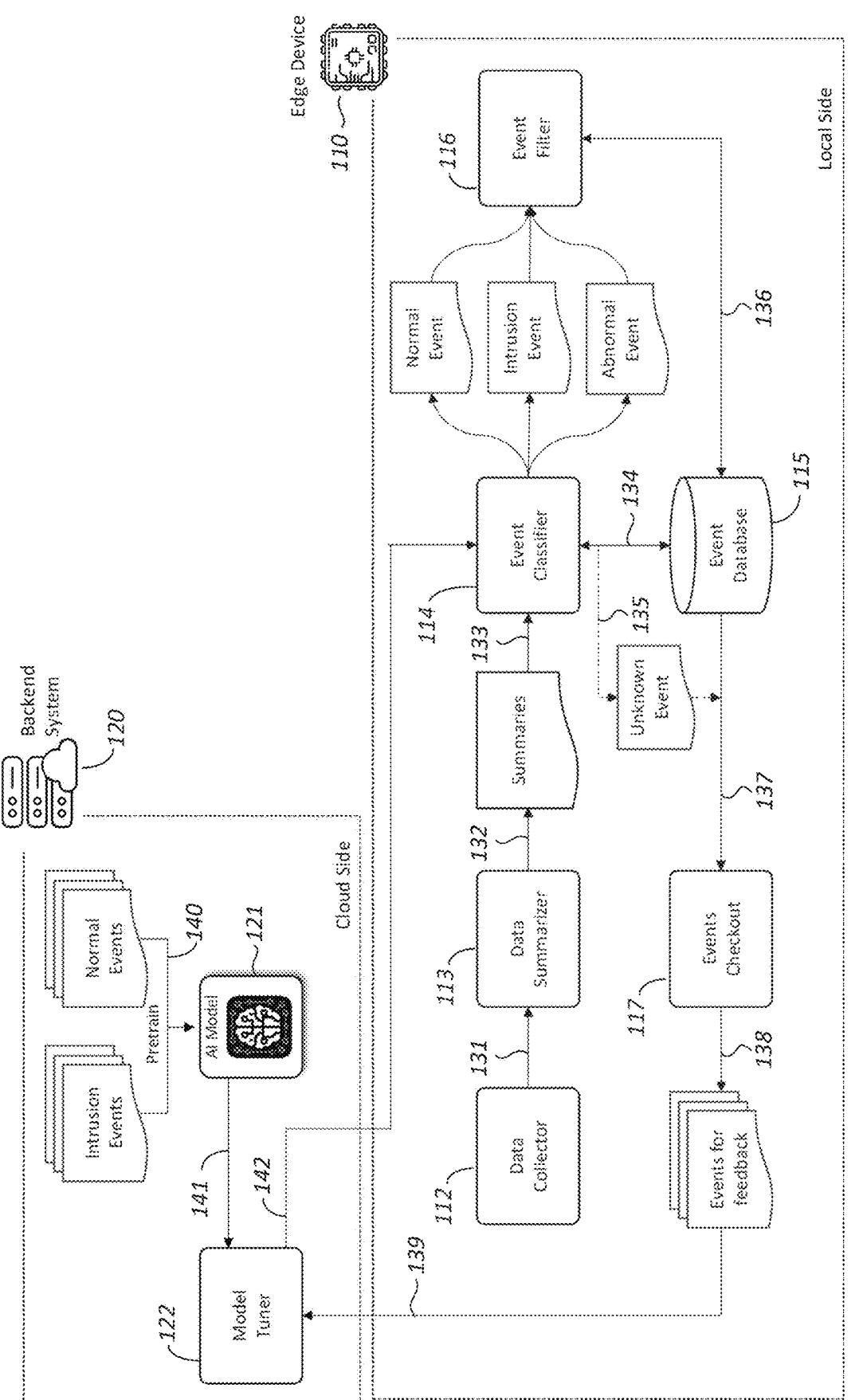
FIG. 2 shows a flow diagram of a method of detecting anomalies at an edge device, in accordance with an embodiment of the present invention.

FIG. 2 shows a flow diagram of a method of detecting anomalies at an edge device, in accordance with an embodiment of the present invention. In the example of FIG. 2, processes performed on the backend system 120 are also referred to as being on the "cloud side" and processes performed on the edge device 110 are also referred to as being on the "local side". The method of the example of FIG. 2 detects intrusion events that occur on a computer network attached to and/or secured by the edge device 110.

Starting the description of FIG. 2 from the local side, the data collector 112 collects monitoring data on the edge device 110. One or more segments of the monitoring data are received by the data summarizer 113 (see arrow 131), which outputs a representative summary of each data segment (see arrow 132). Each summary is input to the event classifier 114 (see arrow 133), which classifies the summary into one of a plurality of event classes. The event classifier 114 may reference summaries represented in the event database (see arrow 134) in accordance with RAG techniques in making the classification. In one embodiment, the event classifier 114 classifies a summary as either a normal event, an intrusion event, or an abnormal event. The event classifier 114 marks the event data of a summary as an "unknown event" when the summary is not similar to other summaries represented in the event database 115 that have the same classification as the summary (see arrow 135).

The event filter 116 updates the event database 115 with event data that meets one or more update criteria (see arrow 136). In one embodiment, the event filter 116 updates the event database 115 with new event data of a summary when the summary has been classified as one of the predetermined classes of events (i.e., normal, intrusion, and abnormal in this example), the confidence level of the classification exceeds a minimum level, and the summary is new relative to other summaries represented in the event database 115.

To control the number of event data records in the event database 115, the events checkout module 117 selects and marks event data that will be removed from the event database 115. Marked event data may be checked out of the event database 115 (see arrow 137) and uploaded to the backend system 120 as feedback data (see arrow 138). For example, event data of a summary that has been deemed to be an unknown event may be marked as feedback data for upload to the backend system 120. Marked event data that do not meet one or more upload criteria may be discarded.

On the cloud side, the generative AI model 121 may be pretrained using training samples of summaries of intrusion events and normal events (see arrow 140). The samples of intrusion events comprise summaries that have been classified as intrusion events, and the samples of normal events comprise summaries that have been classified as normal events. The AI model 121 may also be an open source model (e.g., Tinyllama, *Pythia*, Mistral, Gemma, MobileLLM models) that has been fine-tuned to detect intrusion events and normal events.

The generative AI model 121 is deployed to the edge device 110 as a component of the event classifier 114 after pretraining. The generative AI model 121 may be initially deployed as a complete model or a partially adjusted base model. When the generative AI model 121 is initially deployed as a partially adjusted base model, a Parameter-Efficient Fine-Tuning (PEFT) method, such as LoRA (Low-Rank Adaptation of Large Language Models), can be used to adjust segments of the base model. Then, these adjusted segments can be transmitted to the event classifier 114, where the base model is combined with the adjusted segments. The PEFT method may also be used to update the generative AI model 121 with feedback data from the edge device 110. More particularly, the model tuner 122 receives feedback data from the local side (see arrow 139), and updates an adapter of the generative AI model 121 based on the feedback data (see arrow 141). The adapter is thereafter provided to the local side to update the generative AI model 121 of the event classifier 114 (see arrow 142).

A component of the edge device 110 may perform a response action in response to detecting an intrusion at the edge device 110. The response action may include raising an alert, such as recording the intrusion in an event log, notifying a user or designated personnel (e.g., by email, text messaging), displaying a warning on a display screen, sending a warning signal to the backend system 120, etc. The alert advantageously allows the intrusion to be mitigated. For example, in response to the alert, an investigation may be performed to identify and block the intruder from the computer network.

Figure 3:
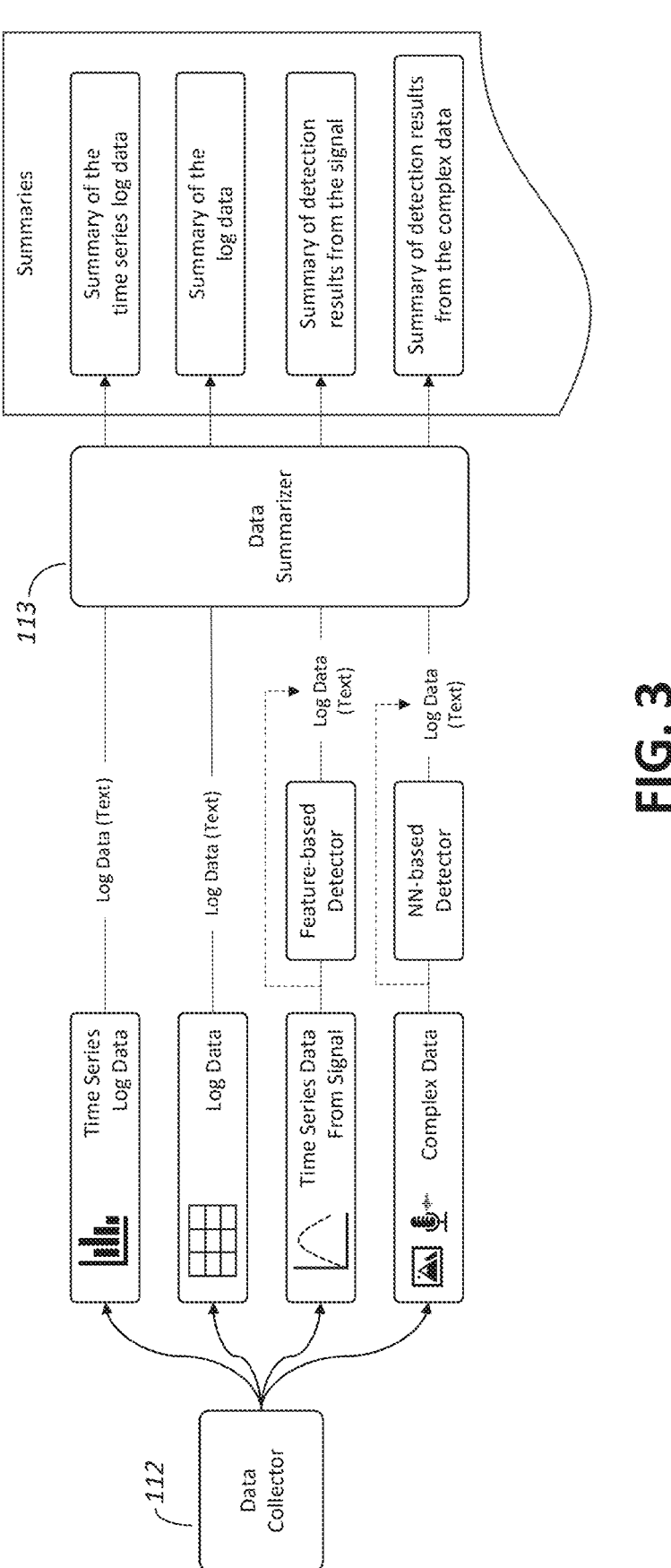
FIG. 3 shows a flow diagram of a method of collecting monitoring data for summarization, in accordance with an embodiment of the present invention.

FIG. 3 shows a flow diagram of a method of collecting monitoring data for summarization, in accordance with an embodiment of the present invention. The data collector 112 may collect monitoring data from various data channels. In the example of FIG. 3, the monitoring data may be time series log data, log data, time series data from a signal, and/or complex data.

Log data is in text form, such as plaintext or structured text. The data collector 112 may retrieve log data directly from network logs, system logs, etc.

Time series data is a sequence of data points indexed in time order. Time series data may be found in a log, such as CAN bus data retrieved by the data collector 112 from a CAN bus log. Time series data may also be from a signal. In that case, the data collector 112 may include a feature-based detector, signal processor, or other suitable detector to detect relevant features of the signal and record the detection results as log data in a detection log. The data collector 112 may also receive time series data of a signal that has already been converted into log data.

Complex data comprises a combination of different types of monitoring data. Complex data may be image data combined with log data, image data combined with audio data, etc. The data collector 112 may include a neural network (NN) based detector to detect relevant features of complex data and record the detection results as log data in a detection log. The data collector 112 may also receive complex data that has already been converted into log data.

Monitoring data in text format is provided by the data collector 112 to the data summarizer 113 in segments. For example, the data collector 112 may extract a segment of the monitoring data from a log, and provide the data segment to the data summarizer 113. The data summarizer 113 receives the data segments, and creates a summary of each data segment. In the example of FIG. 3, the data summarizer 113 creates summaries of time series log data, summaries of log data, summaries of detection results from a signal, and summaries of detection results from complex data.

Figure 4:
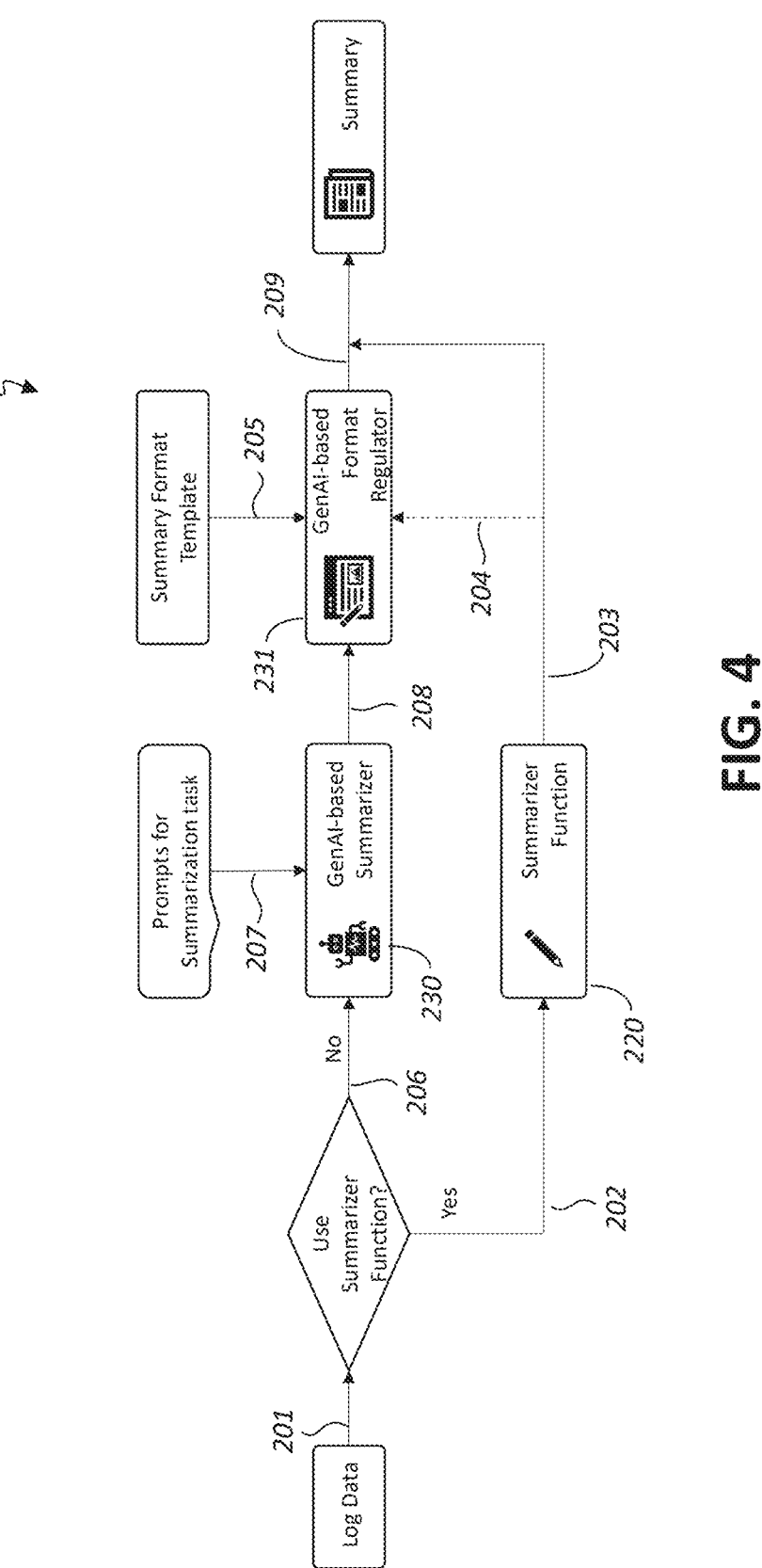
FIG. 4 shows a flow diagram of a method of generating a summary of monitoring data, in accordance with an embodiment of the present invention.

FIG. 4 shows a flow diagram of a method of generating a summary of monitoring data, in accordance with an embodiment of the present invention. In one embodiment, the data summarizer 113 includes a generative AI summarizer 230, a generative AI format regulator 231, and a summarizer function 220. In one embodiment, each of the generative AI summarizer 230 and generative AI format regulator 231 is a language model (LM).

In the example of FIG. 4, log data collected by the data collector 112 is received by the data summarizer 113 (see arrow 201). The data summarizer 113 may employ either the generative AI summarizer 230 or the summarizer function 220 to generate a summary of the log data. The summarizer function 220 may be a summarizing function that is heuristic-based or rule-based. The summarizer function 220 scans the log data for particular features, extracts the features, and arranges the features into a summary in accordance with predefined rules or heuristics. In contrast to using the generative AI summarizer 230, the summarizer function 220 presents a much lighter computational load to the edge device 110. Accordingly, when the data summarizer 113 includes the summarizer function 220 and the log data is suitable for being summarized by the summarizer function 220, the log data is routed to the summarizer function 220 (see arrow 202), which then outputs a summary of the log data (see arrow 203).

Figure 5:
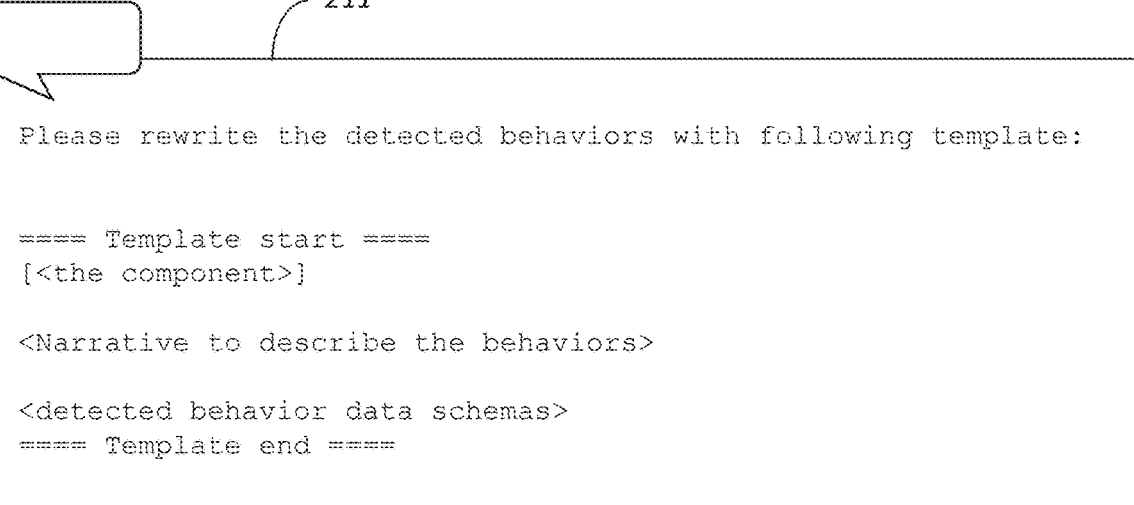
FIG. 5 shows an example prompt where a template may be inserted to control the summary format, in accordance with an embodiment of the present invention.

To maintain consistency of the structure of the summary and thereby maintain the stability of the output of the event classifier 114, the summary may be formatted by the generative AI format regulator 231 to a predetermined format expected by the event classifier 114 (see arrow 204). The generative AIA format regulator 231 may format a summary in accordance with a summary format template (see arrow 205), which may be input to the generative AI format regulator 231 by way of a prompt. The summary format template controls how the summary is to be structured by the generative AI format regulator 231. FIG. 5 shows an example prompt 211 that incorporates a summary format template, in accordance with an embodiment of the present invention. The summary format template may be tailored for a specific monitoring data type or source.

In some cases, the data summarizer 113 does not include the summarizer function 220 or the log data is not suitable to being summarized by the summarizer function 220. In that case, the log data is summarized by the generative AI summarizer 230 (see arrow 206). Prompts for summarization tasks are input to the generative AI summarizer 230 (see arrow 207) to guide the generative AI summarizer 230 to provide a summary of the log data. The prompts may be tailored for particular data channels. The summary generated by the generative AI summarizer 230 is input to the generative AI format regulator 231 (see arrow 208), which formats the summary to the format expected by the event classifier 114 (see arrow 209). The formatted summary is thereafter provided to the event classifier 114.

Figure 6:
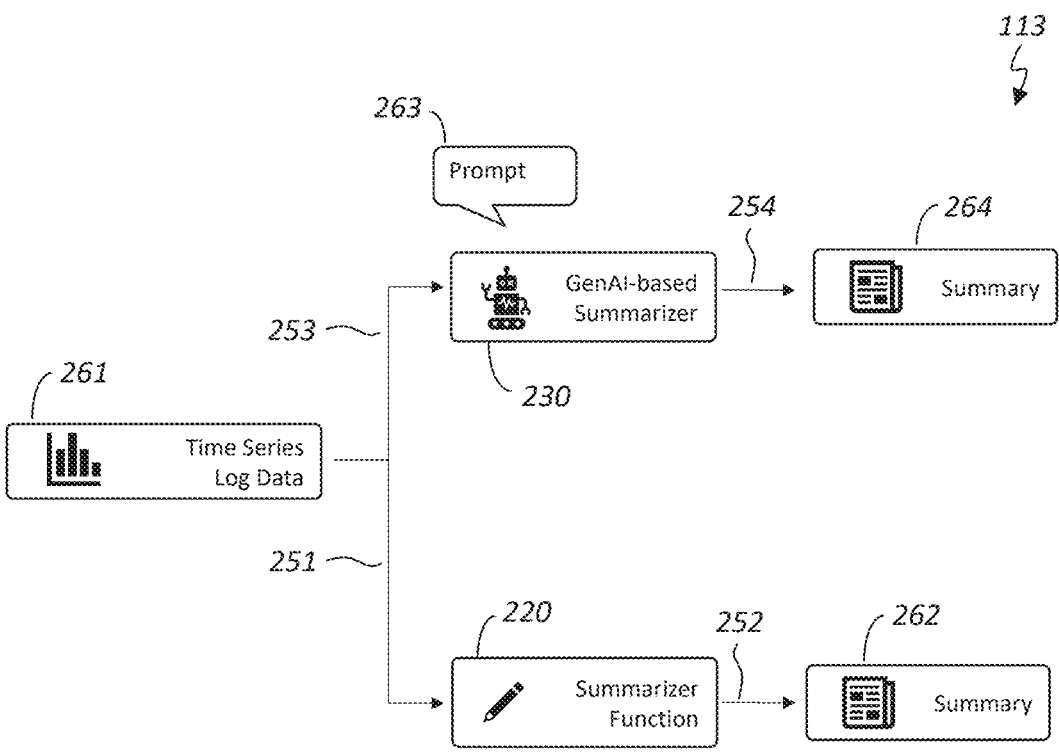
FIG. 6 shows a flow diagram of a method of summarizing timeseries log data, in accordance with an embodiment of the present invention.

The data summarizer 113 may summarize log data based on the data channel. FIG. 6 shows a flow diagram of a method of summarizing timeseries log data, in accordance with an embodiment of the present invention. In the example of FIG. 6, the method is performed by the data summarizer 113. Summary format regulation is not shown in FIG. 6 for clarity of illustration. FIG. 6 illustrates a method of summarizing timeseries log data in the context of an edge device of a connected vehicle. As can be appreciated, the method of FIG. 6 is applicable to other edge devices.

In the example of FIG. 6, a time series log data 261 is a segment of monitoring data taken from a CAN bus log, which is in text form. FIG. 7 shows an example of the time series log data 261. In the example of FIG. 7, the time series log data 261 includes, for each row, a timestamp, CAN ID, CAN channel, and payload of the CAN ID at the timestamp. Other features that can be extracted from the CAN bus log are not shown in FIG. 7.

Generally, a CAN bus has a high frame rate per second, resulting in a significant amount of monitoring data to summarize. This makes it relatively difficult for the generative AI summarizer 230 to summarize a data segment from a CAN bus log. However, this type of monitoring data can be efficiently summarized by heuristics-based or rule-based summarizers, such as the summarizer function 220. In the example of FIG. 6, the summarizer function 220 receives the time series log data 261 (see arrow 251), and creates a summary 262 of the time series log data 261 (see arrow 252). For example, the summarizer function 220 may create the summary 262 that lists the CAN IDs observed on the CAN bus, the channel each CAN ID corresponds to, the average frequency distribution of each CAN ID, the most common payload content of each CAN ID, the count of each CAN ID in the data segment, etc. The structured nature of the CAN bus log allows the summarizer function 220 to readily identify and extract relevant features from the CAN bus log. FIGS. 8A and 8B show an example of the summary 262 for the log data 261 of FIG. 7.

As shown in FIG. 6, the data summarizer 113 may also summarize the time series log data 261 using the generative AI summarizer 230 (see arrow 253). An advantage of using the generative AI summarizer 230 is that it can generate more unique and meaningful words, which benefits the accuracy of downstream recognition tasks. In the example of FIG. 6, a prompt 263 is input to the generative AI summarizer 230 to guide the generative AI summarizer 230 to create a summary 264 of the time series log data 261. The prompt 263 includes instructions that are tailored for generating a summary of CAN bus log data. FIG. 9 shows an example of the prompt 263 for the time series log data 261 of FIG. 7. The prompt 263 guides the generative AI summarizer 230 to summarize the log data 261 in terms of CAN ID, channel ID, frequency of occurrence of the channel ID, etc. FIG. 10 shows an example of the summary 264 that is output by the generative AI summarizer 230 responsive to the prompt 263 of FIG. 9.

Figure 11:
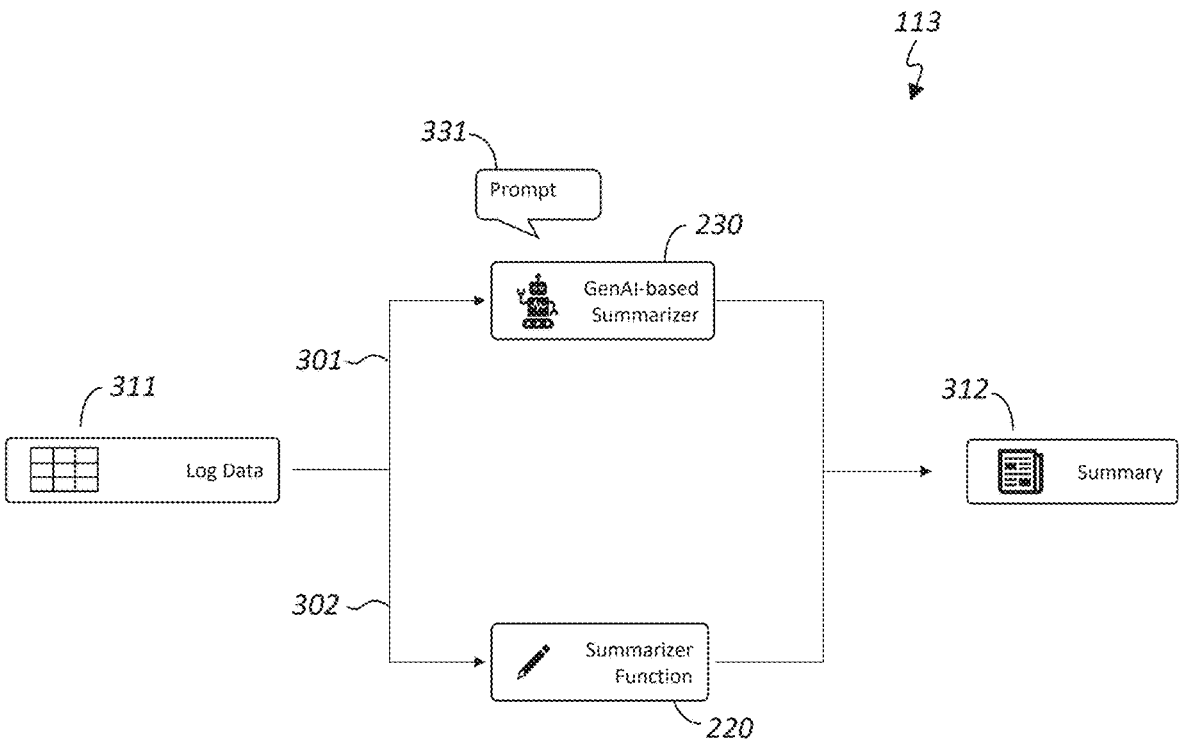
FIG. 11 shows a flow diagram of a method of summarizing plaintext log data, in accordance with an embodiment of the present invention.

FIG. 11 shows a flow diagram of a method of summarizing plaintext log data, in accordance with an embodiment of the present invention. In the example of FIG. 11, the method is performed by the data summarizer 113. Summary format regulation is not shown in FIG. 11 for clarity of illustration.

In the example of FIG. 11, a plaintext log data 311 is a segment of monitoring data taken from a plaintext log, such as a system log or network log. The plaintext log data 311 may be summarized either by the generative AI summarizer 230 (see arrow 301) or by the summarizer function 220 (see arrow 302) into a summary 312. FIG. 12 shows an example of the plaintext log data 311.

Data in a plaintext log is in text form, but typically lacks a strict structure and generally involves a moderate amount of data. This makes it easier for the generative AI summarizer 230 to generate summaries of plaintext log data in a single cycle compared to time series log data. When summarizing plaintext log data, a prompt 331 that is used to prompt the generative AI summarizer 230 preferably includes clear indications of roles and intentions. A role indicates the function or purpose that the generative AI summarizer 230 is designed to fulfill, and an intention indicates the goals or objectives that the generative AI summarizer 230 is expected to achieve within its role. FIG. 13 shows an example of the prompt 331 for the plaintext log data 311 of FIG. 12. The prompt 331 specifies what is expected of the summary, including an overview of the log data, accounts included in the log data, behaviors of users in the log data, etc. FIG. 14 shows an example of a summary 312 generated by the generative AI summarizer 230 for the plaintext log data 311 of FIG. 12 responsive to the prompt 331 of FIG. 13.

Figure 15:
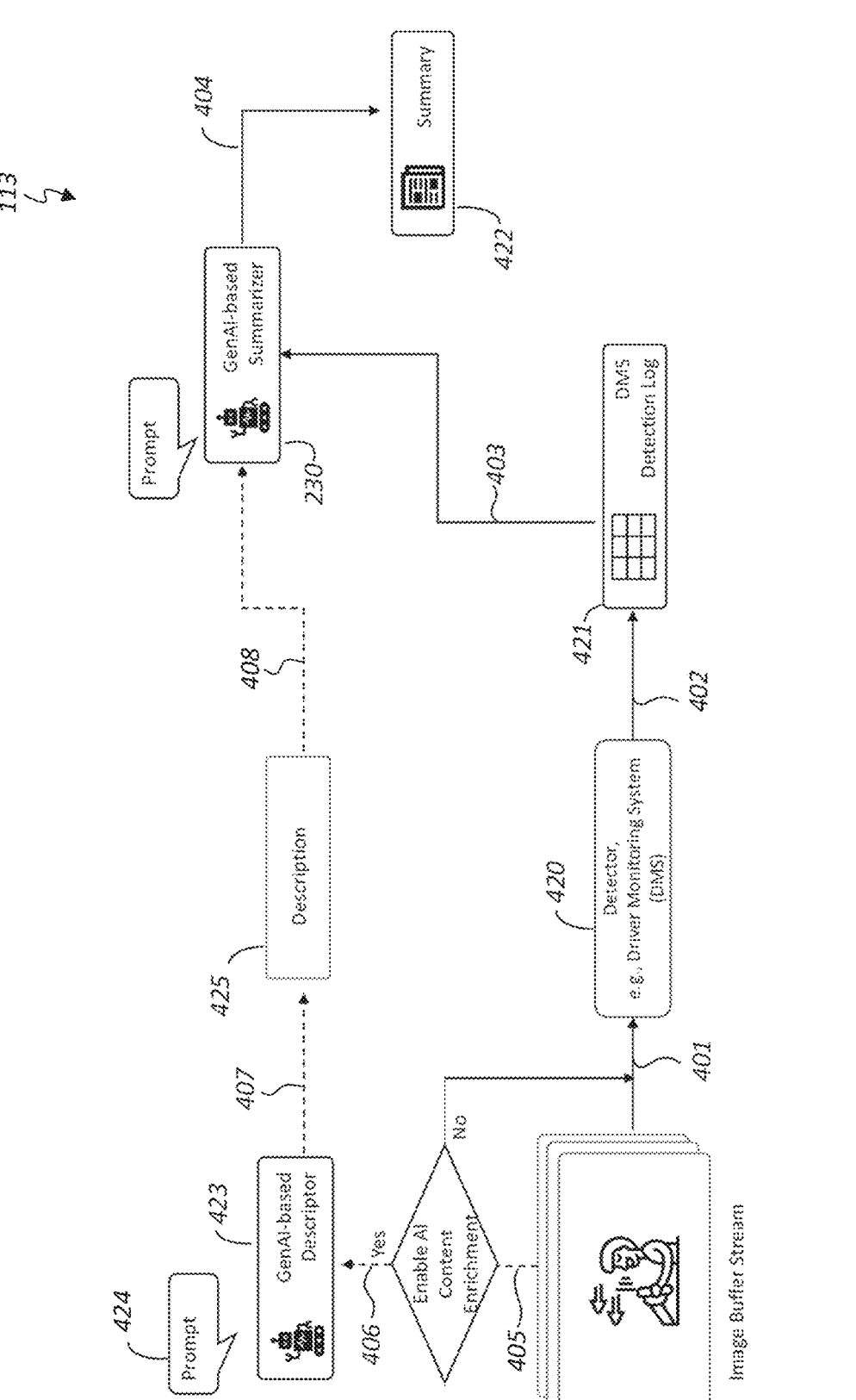
FIG. 15 shows a flow diagram of a method of summarizing complex data, in accordance with an embodiment of the present invention.

FIG. 15 shows a flow diagram of a method of summarizing complex data, in accordance with an embodiment of the present invention. In the example of FIG. 15, the method is performed by the data summarizer 113. Summary format regulation is not shown in FIG. 15 for clarity of illustration. FIG. 15 illustrates a method of summarizing complex data in the context of an edge device of a connected vehicle. As can be appreciated, the method of FIG. 15 is applicable to other edge devices.

In the example of FIG. 15, a raw image buffer stream is received by a detector, which in one embodiment is a driver monitoring system (DMS) 420 (see arrow 401). The raw image buffer stream may be video from a camera. The DMS 420 may be a conventional DMS that records detections of driver behavior in a DMS detection log 421 (see arrow 402). Example monitoring data in the DMS detection log 421 is shown in FIG. 16. In the example of FIG. 16, the DMS 420 detects driver behavior including the identity of the driver, attention, fatigue, drowsiness, etc.

Continuing the example of FIG. 15, the generative AI summarizer 230 receives a segment of monitoring data from the DMS detection log 421 (see arrow 403). The generative AI summarizer 230 is prompted to summarize the data segment into a summary 422 (see arrow 404). An example summary 422 for the DMS detection log 421 of FIG. 16 is shown in FIG. 17. The summary 422 is in accordance with a predefined summary format template that is input to a generative AI format regulator 231 (not shown in FIG. 15).

In the example of FIG. 15, the data summarizer 113 further includes a generative AI descriptor 423. The generative AI descriptor 423 may be a transformer-based decoder that has been trained to describe driver behavior from image data captured by a video camera, audio data captured by a microphone, and/or by other sensors in the connected vehicle. The generative AI descriptor 423 may be multi-modal and include image-to-text, speech-to-text, and/or other functionality for particular applications. In the example of FIG. 15, the generative AI descriptor 423 receives the raw image buffer stream when AI content enhancement is available and can be enabled on the edge device (see arrows 405 and 406). The generative AI descriptor 423 generates a textual description 425 of the raw image buffer stream in accordance with a prompt 424 (see arrow 407). FIG. 18 shows an example prompt 424 that instructs the generative AI descriptor 423 to identify the driver, provide a timestamp, etc. from the raw image buffer stream. FIG. 19 shows an example description 425 generated by the generative AI descriptor 423 responsive to the prompt 424 of FIG. 18. As shown in FIG. 15, a segment of the textual description 425 is input to the generative AI summarizer 230 (see arrow 408), which summarizes the segment into the summary 422 (see arrow 404).

Figure 20:
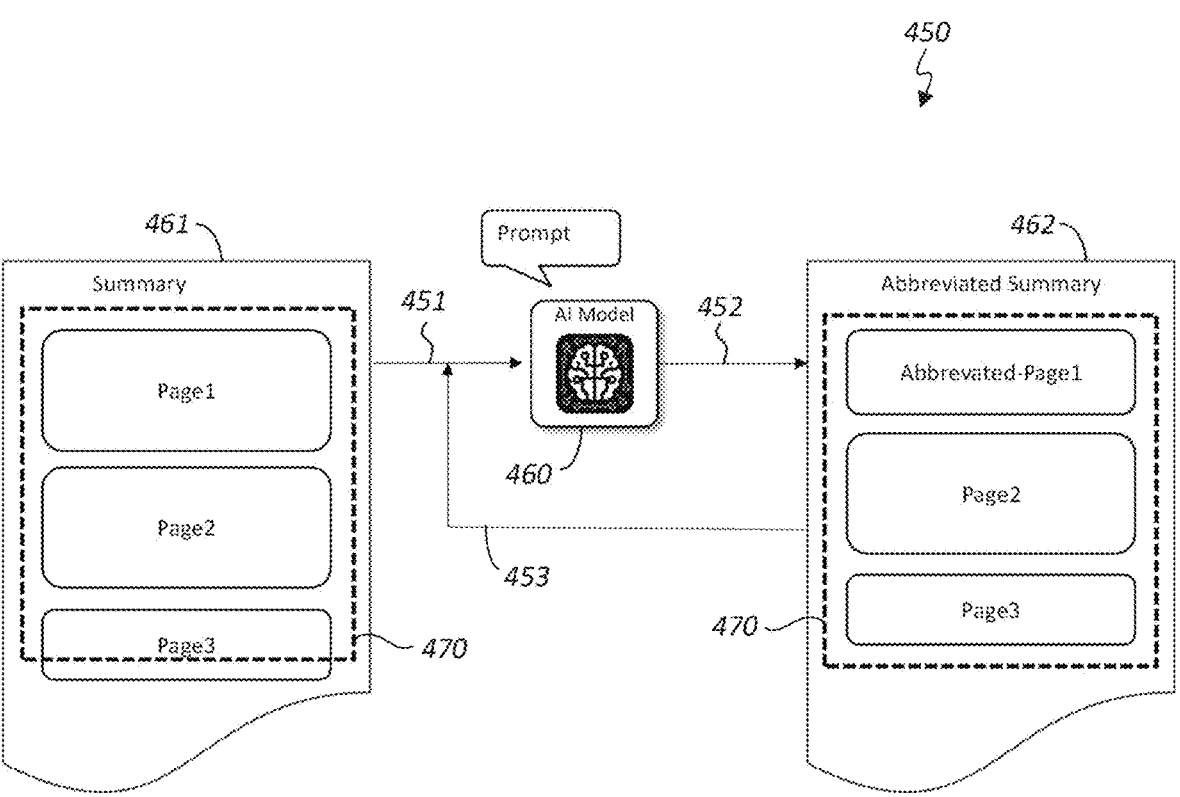
FIG. 20 shows a flow diagram of a paging process, in accordance with an embodiment of the present invention.

FIG. 20 shows a flow diagram of a paging process 450, in accordance with an embodiment of the present invention.

The paging process 450 may be performed by the event classifier 114 or another component on the edge device 110.

The paging process 450 prevents a summary from being too long for input to the generative AI model 121. The paging process 450 abbreviates a summary 461 into a shorter, abbreviated summary 462. The abbreviation may be performed by a generative AI model 460, which may be the generative AI summarizer 230 (see FIG. 4) or another language model. The generative AI model 460 receives the summary 461 (see arrow 451) and rewrites the summary 461 into the abbreviated summary 462 (see arrow 452). A prompt that includes instructions regarding allowable summary length, summary format, etc. guides the generative AI model 460 to abbreviate the summary 461 to meet the input size limits of the generative AI model 121. The paging process 450 may be iterated by inputting the abbreviated summary 462 back into the generative AI model 460 (see arrow 453) until the summary 462 meets the input size limits.

In the example of FIG. 20, the summary 461 has page 1, page 2, and page 3, with each page being a content of the summary 461. A maximum input length 470 may be a maximum page count, maximum word count, etc. The generative AI model 460 abbreviates page 1 so that pages 1-3 will meet the maximum input length 470.

Figure 21:
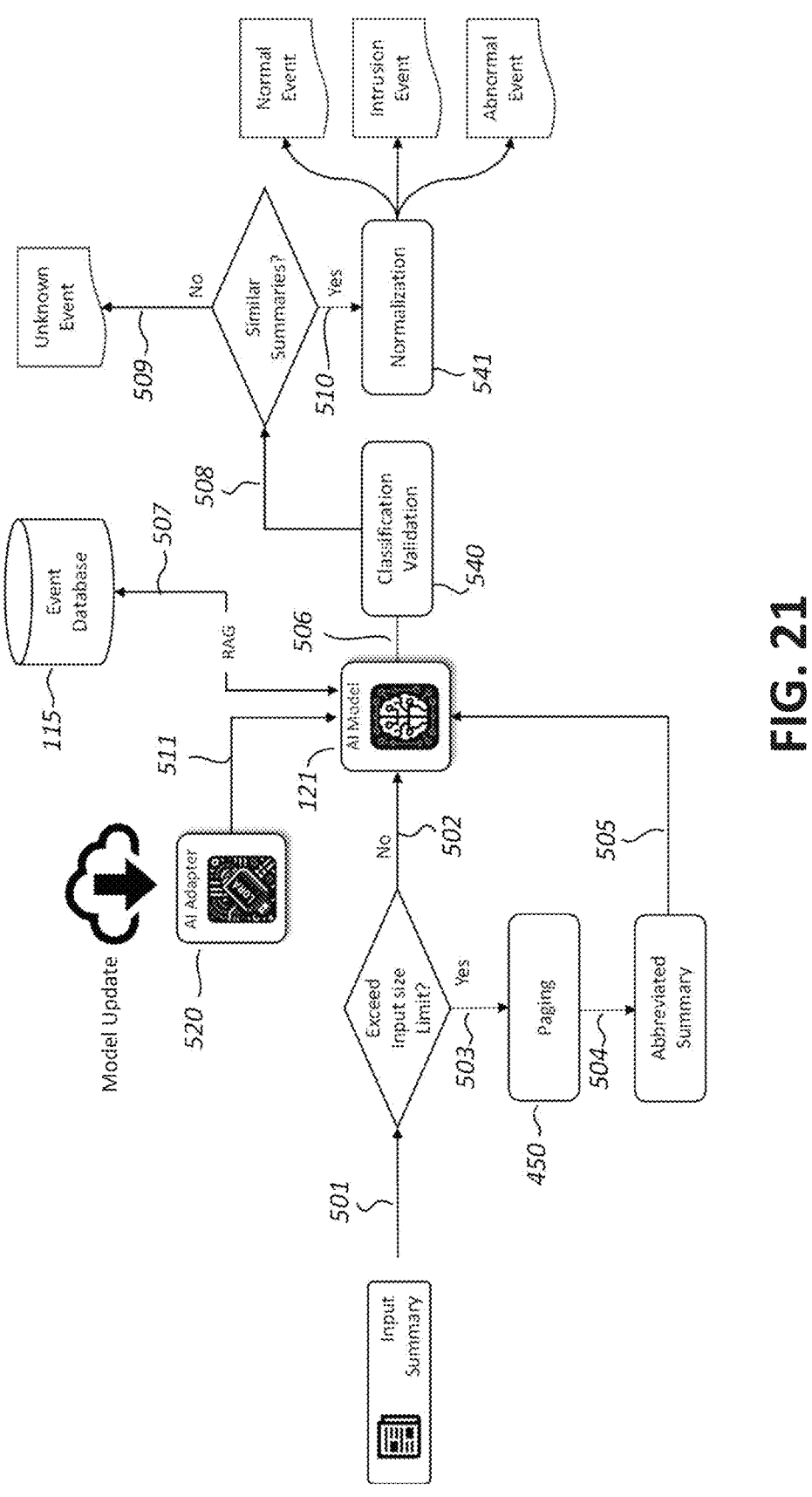
FIG. 21 shows a flow diagram of a method of classifying summaries, in accordance with an embodiment of the present invention.

FIG. 21 shows a flow diagram of a method of classifying summaries, in accordance with an embodiment of the present invention. The method of FIG. 21 may be performed by the event classifier 114 of the edge device 110.

In the example of FIG. 21, an input summary is checked (see arrow 501) for conformance to the input size limit of the generative AI model 121. When the input summary exceeds the input size limit (see arrow 503), the input summary is subjected to the paging process 450 to generate an abbreviated summary (see arrow 504), which is input to the generative AI model 121 for classification (see arrow 505). The generative AI model 121 classifies the input summary (or its abbreviation) to one of a normal event, an intrusion event, or an abnormal event (see arrow 506). The result of the classification is validated by a validation process 540, which determines whether or not the input summary is similar to one or more summaries that are represented as event data in the event database 115 and that have the same classification as the input summary.

In accordance with RAG methodology, in one embodiment, the validation process 540 involves retrieving a top N summaries in the event database 115 (see arrow 507) that are most similar to the input summary relative to other summaries in the event database 115 and that have the same classification as the input summary. The similarity determination maybe performed by converting the input summary and summaries represented in the event database 115 into vectors and comparing the distances between the vectors.

To increase the reliability of the classification, Chain of Thought (CoT) methodology is performed to confirm similarity between summaries. Generally, CoT is an approach in artificial intelligence, particularly in natural language processing, where a model is trained to simulate a step-by-step reasoning process to arrive at a conclusion. In the example of FIG. 21, the event classifier 114 performs CoT methodology to let the generative AI model 121 perform text matching tasks instead of the original content understanding tasks.

FIG. 22 shows an example where CoT methodology is performed to confirm similarity between an input summary and a summary from the event database 115, in accordance with an embodiment of the present invention. As shown in FIG. 22, by asking the generative AI model 121 to read in step-by-step, the generative AI model 121 generates the key points of the text at each step, and finally judges whether the two summaries are similar based on the confidence score and the previous text key points.

Continuing the example of FIG. 21, when the input summary is not similar to any of the top N summaries retrieved from the event database 115, the input summary is deemed indicative of an unknown event. In that case, the classification is deemed not reliable. Accordingly, the input summary is classified as an unknown event and marked for upload to the backend system 120 as feedback data for further investigation (see arrow 509).

When the input summary is similar to at least one of the top N summaries retrieved from the event database 115, the classification of the input summary is deemed to be reliable and thus validated. For example, an intrusion is deemed to have been detected at the edge device 110 when the input summary is classified as an intrusion event and the input summary is similar to at least one of a plurality of summaries retrieved from the event database 115 that are most similar to the input summary relative to other summaries in the event database 115 and that have been classified as intrusion events. A response action, such as a raising an alert, may be performed responsive to detecting an intrusion at the edge device 110. The alert allows further actions to mitigate the intrusion and secure the edge device 110, including identifying and blocking the intruder or source of the intrusion, for example.

A validated input summary undergoes a normalization process 541 (see arrow 510). The normalization process 541 normalizes the input summary and its classification for consistency with other summaries represented in the event database 115. The normalization process 541 may be performed by regular expressions or pattern matching.

In the example of FIG. 21, the generative AI model 121 is updated by receiving an AI adapter 520 from the backend system 120 and mounting the AI adapter 520 on the generative AI model 121 on the edge device 110 (see arrow 511). The AI adapter 520 fine-tunes the generative AI model 121 with feedback data in accordance with PEFT methodology.

Figure 23:
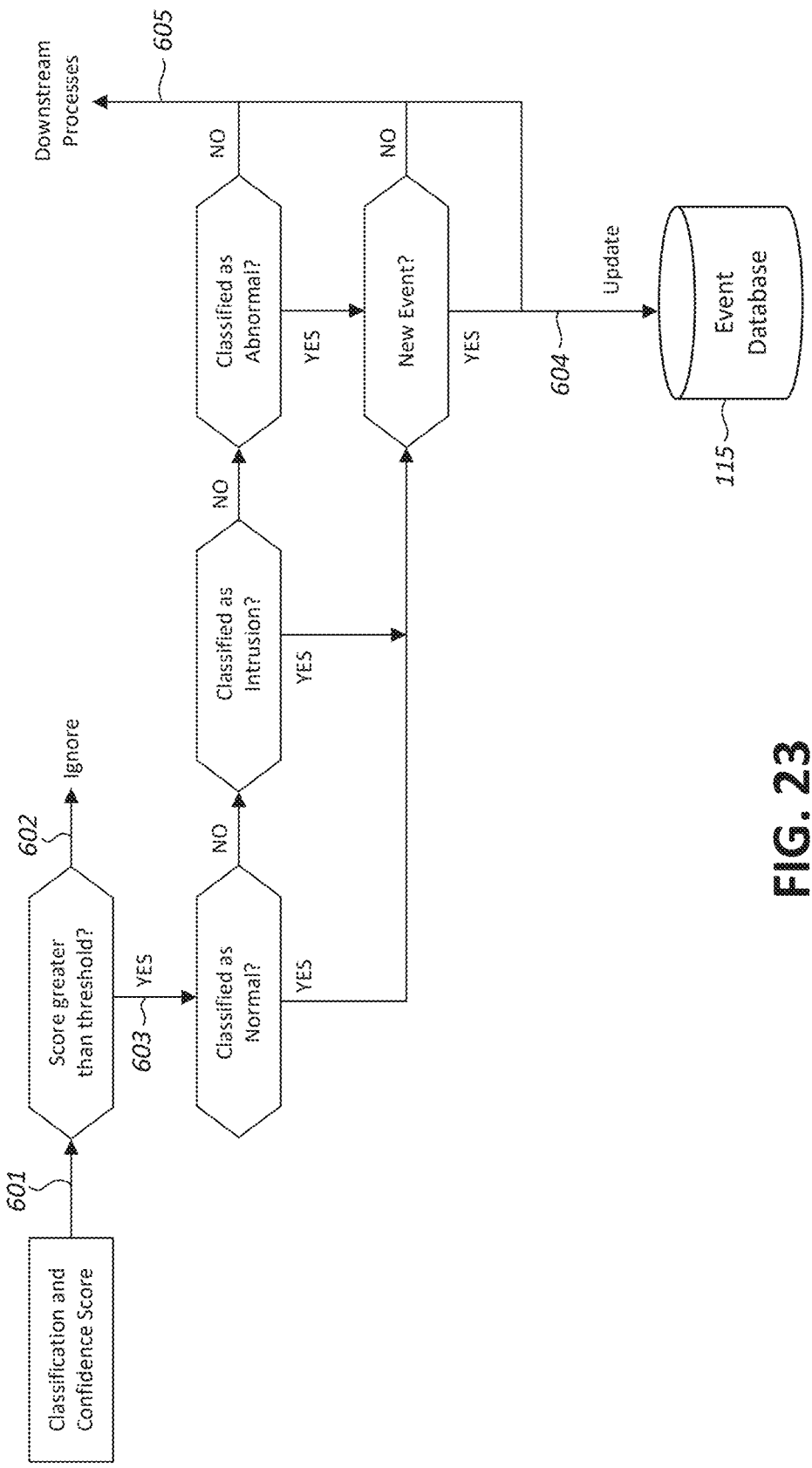
FIG. 23 shows a flow diagram of a method of updating an event database, in accordance with an embodiment of the present invention.

FIG. 23 shows a flow diagram of a method of updating the event database 115, in accordance with an embodiment of the present invention. The method of FIG. 23 may be performed by the event filter 116.

In the example of FIG. 23, the event filter 116 receives, from the event classifier 114, a classification of a summary and a confidence level of the classification (see arrow 601). The confidence level is a confidence score in the example of FIG. 23. When the confidence score is not greater than a confidence threshold, i.e., the classification is not reliable, the event filter 116 ignores the summary (see arrow 602). That is, no event data is created for the summary in the event database 115 and the summary is not taken into further consideration when the summary has not been classified with reasonable certainty.

When the confidence score is greater than the confidence threshold, the event filter 116 takes further action depending on whether the summary is new relative to other summaries represented in the event database 115 (see arrow 603). In the example of FIG. 23, the event filter 116 updates the event database 115 with a new event data of the summary when the summary has been classified as normal, intrusion, or abnormal and the summary is new relative to other summaries represented in the event database 115 (see arrow 604). The summary and its confidence score and classification are provided to downstream processes, as needed, when the confidence score is greater than the confidence threshold (see arrow 605).

The event database 115 may accumulate a significant amount of event data, which would adversely affect the efficiency of the system. To address this concern, the events checkout module 117 selects event data that need to be removed from the event database 115. These selected event data are marked to be checked out of the event database 115 or marked to be discarded. Event data that is checked out of the event database 115 is removed from the event database 115 and uploaded to the backend system 120 as feedback data.

In one embodiment, event data of intrusion events are always checked out of the event database 115.

In one embodiment, event data of an abnormal event is checked out of the event database 115 when the event data is close to a cluster of event data of abnormal events or when the event data is close to a cluster of event data of intrusion events. The event data of the abnormal event is discarded when the event data is close to a cluster of event data of normal events, when the event data is not close to a cluster of event data of abnormal events, or when the event data is not close to a cluster of event data of intrusion events. In these cases where the event data of an abnormal event is discarded, the summary of the event data has been classified as abnormal, but the classification is deemed not reliable.

In one embodiment, event data of a normal event is checked out of the event database 115 when the event data is close to a cluster of event data of normal events. Otherwise, the event data will be discarded.

Figure 24:
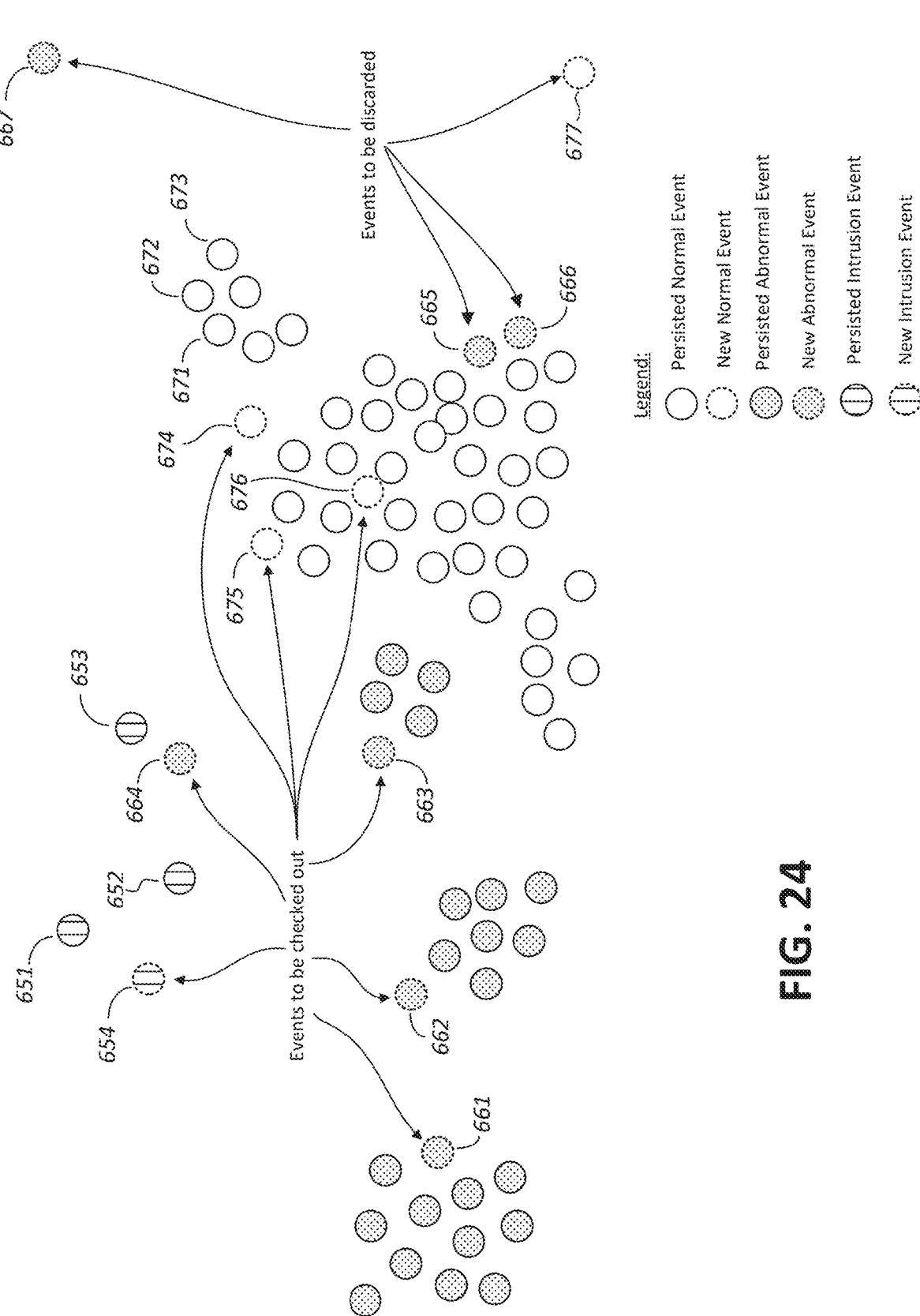
FIG. 24 graphically illustrates an example operation of an events checkout module, in accordance with an embodiment of the present invention.

FIG. 24 graphically illustrates an example operation of the events checkout module 117, in accordance with an embodiment of the present invention. In the example of FIG. 24, each circle represents an event with corresponding event data in the event database 115. Each event data includes a corresponding summary and classification of the summary as a normal event, intrusion event, or abnormal event. A solid circle represents an event with event data that is part of the pretraining of the generative AI model 121 of the event classifier 114, which is also referred to as a persisted event. A dashed circle represents an event with corresponding event data that has been collected after the pretraining, which is referred to herein as a new event. FIG. 24 arranges events in terms of distance of summaries of their corresponding event data in vector space.

In the example of FIG. 24, the events 651-654 and circles that are hashed the same way (vertical lines) are intrusion events. Because the event 654 is a new event, the event data of the event 654 is checked out of the event database 115 to be used as feedback data for updating the generative AI model 121. It is to be noted that once event data of a new event has been incorporated into the generative AI model 121 as part of an update, the new event becomes a persisted event and is so identified in the event database 115.

In the example of FIG. 24, the events 661-667 and circles that are hashed the same way (dotted) are abnormal events. The event data of the events 661-663 are to be checked out of the event database 115 because they are close to a cluster of event data of abnormal events. Also, event data of the event 664 is to be checked out of the event database 115 because it is close to a cluster of event data of intrusion events. However, event data of the events 665 and 666 are to be discarded because they are close to a cluster of normal events. Similarly, event data of the event 667 is to be discarded because the event 667 is not close to a cluster of event data of abnormal events or a cluster of event data of intrusion events.

In the example of FIG. 24, the events 671-677 and circles that are hashed the same way (solid white) are normal events. Event data of the events 674-676 are to be checked out of the event database 115 because they are close to clusters of event data of normal events. However, event data of the event 677 is to be discarded because it is not close to a cluster of event data of normal events.

Figure 25:
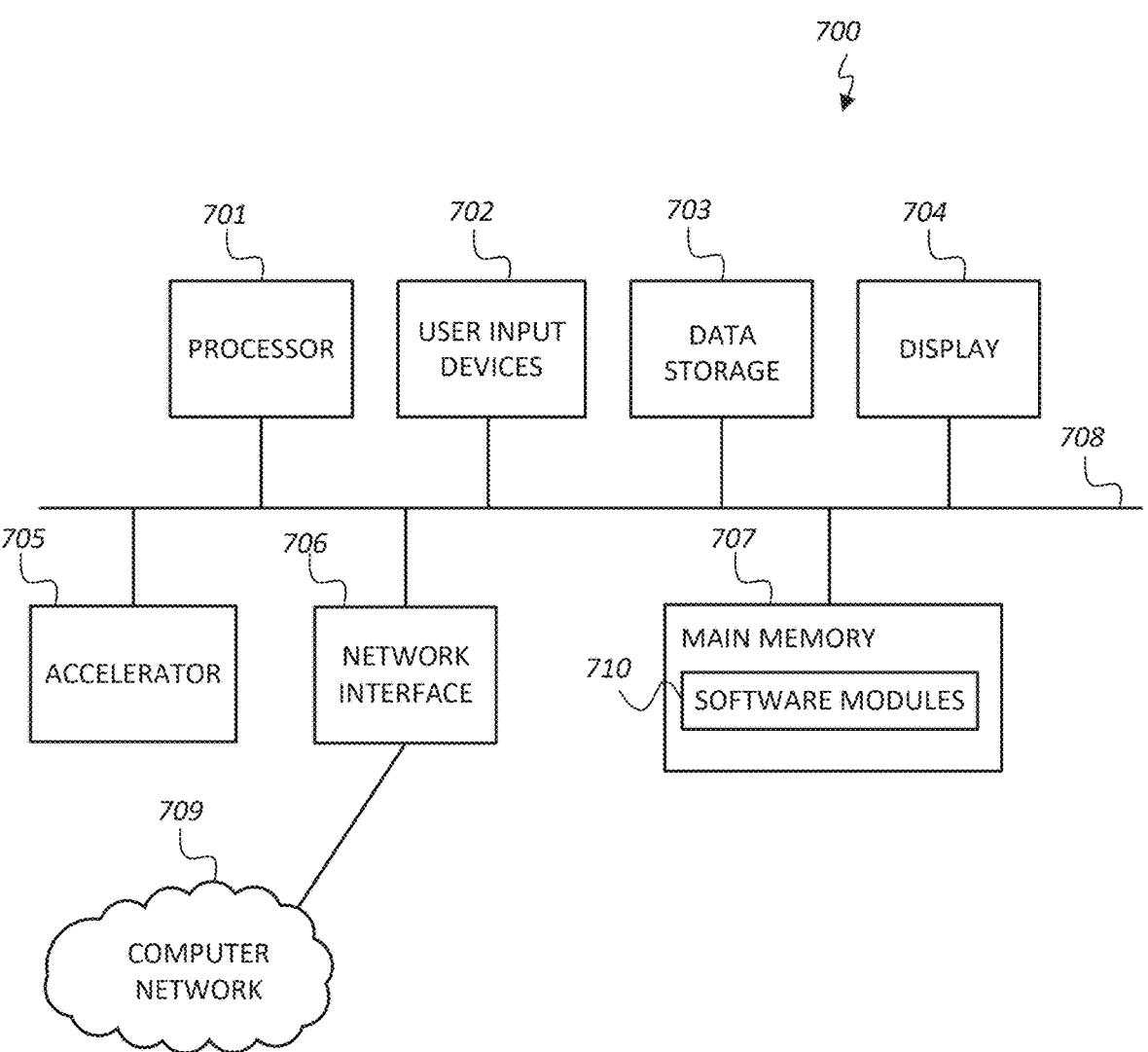
FIG. 25 shows a block diagram of a computer system that may be employed with embodiments of the present invention.

FIG. 25 shows a block diagram of a computer system 700 that may be employed with embodiments of the present invention. The computer system 700 may be employed as an edge device, a backend system, or other computer described herein. The computer system 700 may have fewer or more components to meet the needs of a particular application. The computer system 700 may include one or more processors 701, one or more user input devices 702 (e.g., keyboard, mouse), one or more data storage devices 703 (e.g., hard drive, optical disk, solid state drive), a display screen 704 (e.g., liquid crystal display, flat panel monitor), one or more accelerators 705 (e.g., graphics processing unit (GPU), neural processing unit (NPU)), a computer network interface 706 (e.g., network adapter, modem), and a main memory 707 (e.g., random access memory). The computer system 700 may have one or more buses 708 coupling its various components. The computer network interface 706 may be coupled to a computer network 709, which in this example includes the public Internet.

The computer system 700 is a particular machine as programmed with one or more software modules 710, comprising instructions stored non-transitory in the main memory 707 for execution by at least one processor 701 to cause the computer system 700 to perform corresponding programmed steps. An article of manufacture may be embodied as computer-readable storage medium including instructions that when executed by at least one processor 701 cause the computer system 700 to be operable to perform the functions of the one or more software modules 710.

Systems and methods for detecting anomalies at an edge device have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting intrusions at an edge device of a computer network, the method to be performed by the edge device and comprising:

collecting monitoring data of the computer network;
extracting a data segment of the monitoring data;
generating a summary of the data segment;
in a first intrusion detection operation, classifying the summary using a generative artificial intelligence (AI) model into one of a plurality of classifications that include at least an intrusion event and a normal event;
retrieving, from a database of summaries, a set of summaries that have been classified as intrusion events;
in a second intrusion detection operation, in response to the summary being classified by the generative AI model as an intrusion event, determining similarity of the summary to the set of summaries;
detecting an intrusion at the edge device in response to the summary being similar to one or more summaries of the set of summaries; and raising an alert responsive to detecting the intrusion,
wherein the edge device is an electronic control unit (ECU) of a connected vehicle and the computer network is a controller area network (CAN).

2. The method of claim 1, further comprising:
before classifying the summary, formatting the summary into a predefined summary format.

3. The method of claim 2, further comprising:
determining whether the summary meets an input size limit of the generative AI model; and
before classifying the summary, abbreviating the summary to meet the input size limit of the generative AI model.

4. The method of claim 1, wherein the set of summaries are recorded as event data in the database.

5. The method of claim 4, further comprising:
checking out marked event data from the event database for upload from the edge device to a backend system in the cloud.

6. The method of claim 5, further comprising:
updating the generative AI model using fine-tuning data from the backend system, wherein the fine-tuning data are based on the marked event data uploaded to the backend system.

7. A system for detecting intrusions at edge devices, the system comprising:
a backend system comprising at least one processor and a memory, the memory of the backend system storing instructions that when executed by the at least one processor cause the backend system to:
train a generative artificial intelligence (AI) model using a training dataset of normal events and intrusion events; and
provide an update to the generative AI model to the edge device; and
the edge device comprising at least one processor and a memory, the memory of the edge device storing instructions that when executed by the at least one processor of the edge device cause the edge device to:
collect monitoring data of a computer network;
generate a summary of the monitoring data;
in a first intrusion detection operation, classify the summary using the generative AI model into one of a plurality of classifications that include at least an intrusion event and a normal event;
in a second intrusion detection operation, in response to the summary being classified by the generative AI model as an intrusion event, validate the classification of the summary based on similarity of the summary to previous summaries that have a same classification as the summary; and
detect an intrusion at the edge device in response to the classification of the summary as an intrusion event and the summary is similar to one or more of the previous summaries that have been classified as intrusion events,
wherein the edge device is an electronic control unit (ECU) of a connected vehicle, and
wherein the computer network is a controller area network (CAN) of the connected vehicle, and the monitoring data comprises CAN bus data.

8. The system of claim 7, wherein the instructions stored in the memory of the edge device when executed by the at least one processor of the edge device cause the edge device to:
before classifying the summary, format the summary into a predefined summary format.

9. The system of claim 8, wherein the instructions stored in the memory of the edge device when executed by the at least one processor of the edge device cause the edge device to:

determine whether the summary meets an input size limit of the generative AI model; and before classifying the summary, abbreviate the summary to meet the input size limit of the first generative AI model.

10. The system of claim 7, wherein the summary and the previous summaries have corresponding event data that are stored in an event database that is local to the edge device.

11. The system of claim 10, wherein the instructions stored in the memory of the edge device when executed by the at least one processor of the edge device cause the edge device to:

store the summary as event data in the event database; and check out marked event data from the event database for upload to the backend system as feedback data.

12. The system of claim 11, wherein the instructions stored in the memory of the backend system when executed by the at least one processor of the backend system cause the backend system to:

create an update for the generative AI model using feedback data received from the edge device; and provide the update to the edge device.

\* \* \* \* \*